United States Patent
Liu et al.

(10) Patent No.: US 11,747,898 B2
(45) Date of Patent: *Sep. 5, 2023

(54) METHOD AND APPARATUS WITH GAZE ESTIMATION

(71) Applicant: Samsung Electronics Co., Ltd., Suwon-si (KR)

(72) Inventors: Xiabing Liu, Beijing (CN); Hui Zhang, Beijing (CN); Jae-Joon Han, Seoul (KR); Changkyu Choi, Seongnam-si (KR); Tianchu Guo, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 100 days.

This patent is subject to a terminal disclaimer.

(21) Appl. No.: 17/394,653

(22) Filed: Aug. 5, 2021

(65) Prior Publication Data

US 2021/0366152 A1    Nov. 25, 2021

Related U.S. Application Data

(63) Continuation of application No. 16/722,221, filed on Dec. 20, 2019, now Pat. No. 11,113,842.

(30) Foreign Application Priority Data

Dec. 24, 2018  (CN) .......................... 201811582119.9
Sep. 23, 2019  (KR) .......................... 10-2019-0116694

(51) Int. Cl.
*G06V 10/82*    (2022.01)
*G06F 3/01*    (2006.01)
(Continued)

(52) U.S. Cl.
CPC ................ *G06F 3/013* (2013.01); *G06T 7/74* (2017.01); *G06V 10/764* (2022.01); *G06V 10/82* (2022.01);
(Continued)

(58) Field of Classification Search
CPC ................ G02B 27/0093; G06F 3/013; G06T 2207/20021; G06T 2207/20076;
(Continued)

(56) References Cited

U.S. PATENT DOCUMENTS 8,594,374 B1    11/2013  Bozarth
2003/0218672 A1    11/2003  Zhang et al.
(Continued)

FOREIGN PATENT DOCUMENTS

CN    111325736 A  *  6/2020  .......... G06N 3/0454
KR    10-2012-0006819 A    1/2012
(Continued)

OTHER PUBLICATIONS

Wang et al., "2D Gaze Estimation Based on Pupil-Glint Vector Using an Artificial Neural Network," Applied Sciences, 2016, 17 pages.
(Continued)

*Primary Examiner* — Ian L Lemieux
(74) *Attorney, Agent, or Firm* — NSIP Law

(57) ABSTRACT

A gaze estimation method and apparatus is disclosed. The gaze estimation method includes obtaining an image including an eye region of a user, extracting, from the obtained image, a first feature of data, obtaining a second feature of data used for calibration of a neural network model, and estimating a gaze of the user using the first feature and the second feature.

13 Claims, 15 Drawing Sheets

(51) Int. Cl.
  *G06T 7/73* (2017.01)
  *G06V 10/764* (2022.01)
  *G06V 40/18* (2022.01)
  *G06V 20/20* (2022.01)

(52) U.S. Cl.
  CPC .... *G06V 40/18* (2022.01); *G06T 2207/20021* (2013.01); *G06T 2207/20076* (2013.01); *G06T 2207/20081* (2013.01); *G06T 2207/20084* (2013.01); *G06T 2207/30201* (2013.01); *G06V 20/20* (2022.01)

(58) Field of Classification Search
  CPC . G06T 2207/20081; G06T 2207/20084; G06T 2207/30201; G06T 7/73; G06T 7/74; G06V 10/764; G06V 10/82; G06V 20/20; G06V 40/18
  See application file for complete search history.

(56) References Cited

U.S. PATENT DOCUMENTS

| | | |
|---|---|---|
| 2004/0174496 A1 | 9/2004 | Ji et al. |
| 2011/0012896 A1 | 1/2011 | Ji |
| 2013/0083976 A1 | 4/2013 | Ragland |
| 2014/0191946 A1 | 7/2014 | Cho et al. |
| 2015/0278599 A1 | 10/2015 | Zhang et al. |
| 2015/0339589 A1 | 11/2015 | Fisher |
| 2016/0094705 A1 | 3/2016 | Vendrow |
| 2016/0335475 A1 | 11/2016 | Krenzer et al. |
| 2017/0031437 A1 | 2/2017 | Qian et al. |
| 2017/0308734 A1 | 10/2017 | Chalom et al. |
| 2017/0372487 A1 | 12/2017 | Lagun et al. |
| 2019/0080474 A1 | 3/2019 | Lagun et al. |
| 2019/0259174 A1 | 8/2019 | De Villers-Sidani et al. |
| 2019/0303724 A1 | 10/2019 | Linden |
| 2020/0134868 A1 | 4/2020 | Liu et al. |
| 2020/0364539 A1 | 11/2020 | Anisimov et al. |
| 2022/0189093 A1 * | 6/2022 | Xiao ...................... G06F 3/167 |

FOREIGN PATENT DOCUMENTS

| | | | |
|---|---|---|---|
| KR | 10-2012-0127790 A | 11/2012 | |
| KR | 10-1706992 B1 | 2/2017 | |
| WO | WO 2018/0064141 A1 | 4/2018 | |
| WO | WO-2020186883 A1 * | 9/2020 | ........... G06K 9/0061 |
| WO | WO-2021204449 A1 * | 10/2021 | ............. G06F 3/012 |

OTHER PUBLICATIONS

Partial European Search Report dated Apr. 3, 2020 in corresponding European Patent Application No. 19219452.0 (16 pages in English).

* cited by examiner

Calibration feature

FIG. 15
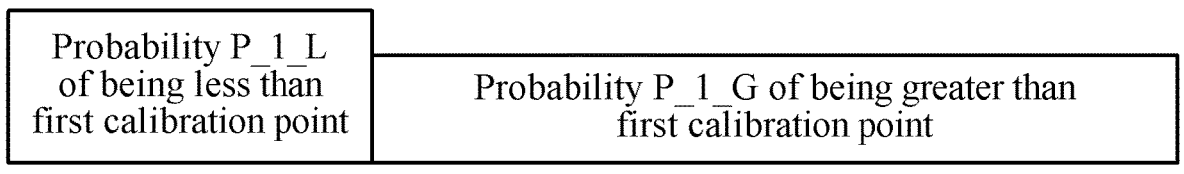
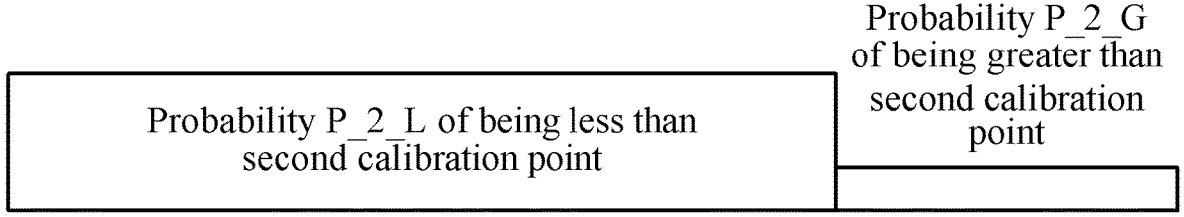
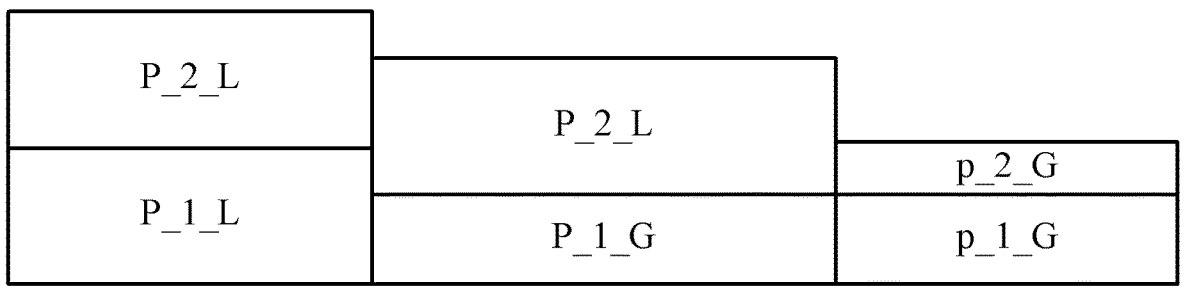

METHOD AND APPARATUS WITH GAZE ESTIMATION

CROSS-REFERENCE TO RELATED APPLICATIONS

This application is a continuation of U.S. patent application Ser. No. 16/722,221 filed on Dec. 20, 2019, which claims the benefit under 35 USC § 119(a) of Chinese Patent Application No. 201811582119.9 filed on Dec. 24, 2018, in the State Intellectual Property Office of the People's Republic of China (PRC), and Korean Patent Application No. 10-2019-0116694 filed on Sep. 23, 2019, in the Korean Intellectual Property Office, the entire disclosures of which are incorporated herein by reference for all purposes.

BACKGROUND

1. Field

The following description relates to a method and apparatus with gaze estimation.

2. Description of Related Art

A typical gaze estimation technology estimates the gazes of all individual humans using a single basic model. Such typical technology obtains general parameters to be used to construct the basic model by fitting, in the basic model, numerous human eye images as training data. This basic model may be effective in estimation for an individual having a similar eye shape to an eye shape corresponding to the general parameters. That is, accuracy in gaze estimation using the basic model may be relatively high. However, eye shapes are different from individual to individual, and thus such accuracy or efficiency of the basic model may be degraded for an individual having an eye shape that is relatively greatly different from the eye shape corresponding to the general parameters.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented gaze estimation method includes obtaining an image including an eye region of a user, extracting, from the obtained image, a first feature of data and a second feature of data used for calibration of a neural network model, and estimating a gaze of the user using the first feature and the second feature.

An application displayed on a display screen corresponding to a position of the estimated gaze may be executed.

The extracting of the first feature may include extracting the first feature using the neural network model. The second feature may be extracted using the neural network model.

The estimating of the gaze of the user may include estimating a position of a gaze point in a gaze area of the user from the first feature and the second feature using the neural network model.

The estimating of the gaze of the user may include calculating a feature difference between the first feature and the second feature, estimating an output result of the neural network model corresponding to the calculated feature difference using the neural network model, calculating a probability that the gaze point is included in each of subareas into which the gaze area is divided based on the estimated output result, and determining, to be the position of the gaze point, a center position of a subarea having a greatest probability among probabilities calculated for the subareas.

When the gaze area is on a two-dimensional (2D) plane, the subareas of the gaze area may be obtained by setting two straight lines intersecting perpendicularly at each calibration point, and the gaze area may be divided into the subareas based on the set straight lines.

When the gaze area is in a three-dimensional (3D) space, the subareas of the gaze area may be obtained by setting three straight lines intersecting orthogonally at each calibration point, and the gaze area may be divided into the subareas based on the set straight lines.

The calculating of the probability may include, in response to the estimated output result of the neural network model corresponding to each calibration point, determining a probability that a coordinate in each dimension of the gaze point is less or greater than a coordinate in each dimension of each calibration point, and calculating the probability that the gaze point is included in each of the subareas based on the determined probability.

The calculating of the probability that the gaze point is included in each of the subareas based on the determined probability may include calculating the probability that the gaze point is included in each of the subareas based on a comparative relationship probability of each of the subareas.

Before the estimating of the gaze of the user, the gaze estimation method may further include, when a point is used as one of the calibration points, obtaining data to be used for the calibration of the neural network model based on a user action performed in response to the point.

The point may include at least one of a point on a screen of an electronic apparatus, a point at a position of a button on the electronic apparatus, or a point having a relative position with respect to the electronic apparatus.

The gaze estimation method may further include displaying a calibration point, obtaining a calibration image which is obtained by capturing an image of the user when the user gazes at the displayed calibration point, and performing the calibration on the neural network model using the obtained calibration image.

The obtaining of the calibration image may include, when a gesture performed by the user in response to the calibration point is received, determining a distance between an operation point corresponding to the gesture and the calibration point, and determining the obtained calibration image to be an image to be used to perform the calibration in response to the determined distance being less than a threshold value. The performing of the calibration on the neural network model may include performing the calibration on the neural network model using the determined image.

The gaze estimation method may further include obtaining the neural network model. The obtaining of the neural network model may include training the neural network model using training data used to train the neural network model.

The training data may include a first user image and a second user image. The first user image and the second user image may be an image of the same user obtained when the user gazes at a first object and an image of the same user obtained when the user gazes at a second object, respectively. The training of the neural network model may include training the neural network model that uses, as an input, the first user image and the second user image, and outputs data of a relationship between relative positions of the first object and the second object.

The training data may include image-related data to be used to train the neural network model and a sight tag for the training. The training of the neural network model may include classifying a label of the sight tag into two categories, determining a loss function corresponding to the sight tag classified into the two categories, and training the neural network model using an image for the training, the sight tag classified into the two categories, and the loss function.

The classifying of the label of the sight tag into the two categories may include determining a coordinate on a coordinate axis of the sight tag to be used for the training, setting a plurality of nodes at a preset interval based on the coordinate axis, and generating the sight tag classified into the two categories and including a vector having the number of the nodes as a dimension. A value of each dimension of the vector may be determined by a size of the preset interval and the coordinate on the coordinate axis. The loss function may be calculated based on an activation probability to be calculated by the determined value of each dimension of the vector and training data corresponding to each of the nodes.

A first neural network model and a second neural network model may have a same network layer for feature extraction, and training of a second neural network model-based classifier using two pairs of samples may include training the second neural network model-based classifier using two sets of image-related data and two category tags corresponding to the two sets of image-related data that are included in the two pairs of samples.

In another general aspect, a gaze estimation apparatus includes at least one processor. The processor is configured to obtain an image including an eye region of a user, control the gaze estimation apparatus to extract a first feature of data and a second feature of data used for calibration of a neural network model, and estimate a gaze of the user using the extracted first feature and the second feature.

An application displayed on a display screen corresponding to a position of the estimated gaze may be executed.

Other features and aspects will be apparent from the following detailed description, the drawings, and the claims.

BRIEF DESCRIPTION OF THE DRAWINGS

FIG. 15 is a diagram illustrating an example of a histogram indicating an area probability distribution.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
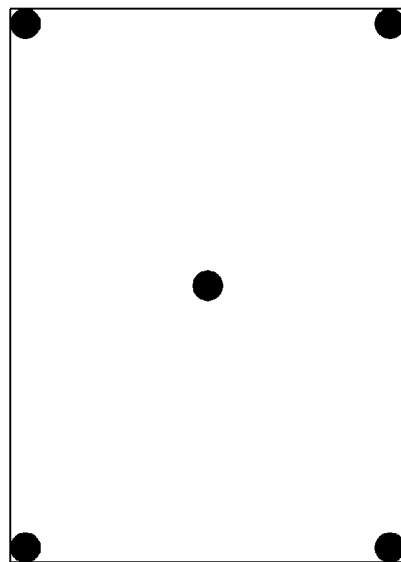
FIGS. 1 through 3 are diagrams illustrating examples of calibration points.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular examples only, and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof.

In addition, terms such as first, second, A, B, (a), (b), and the like may be used herein to describe components. Each of these terminologies is not used to define an essence, order, or sequence of a corresponding component but used merely to distinguish the corresponding component from other component(s).

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

Unless otherwise defined, all terms, including technical and scientific terms, used herein have the same meaning as commonly understood by one of ordinary skill in the art to which this disclosure pertains consistent with and after an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

Also, in the description of example embodiments, detailed description of structures or functions that are thereby known after an understanding of the disclosure of the present application will be omitted when it is deemed that such description may make available an ambiguous interpretation of the one or more example embodiments.

Hereinafter, examples will be described in detail with reference to the accompanying drawings, and like reference numerals in the drawings refer to like elements throughout.

Example embodiments to be described hereinafter relate to gaze estimation, and more particularly, to methods and apparatus with gaze estimation adaptable to a user. Through such adaptive gaze estimation, it is possible to provide relatively highly accurate results of gaze estimation for various users, without attendant low level of accuracy in estimating a gaze of different users.

In an actual application of the adaptive gaze estimation, the gaze estimation may be utilized by an example of a gaze estimation product designed for a particular user. An example of the gaze estimation product may be, for example, a mobile device. The gaze estimation may also be provided to a gaze estimation product provided to a particular user to be used by the user for a predetermined period of time. In such example, the gaze estimation product may be, for example, augmented virtual reality (AVR) glasses for hands-on experience of augmented reality (AR) or virtual reality (VR). To encourage a sense of such experience, changing a basic model for gaze estimation may be desired. The changing of the basic model for gaze estimation may be referred to herein as calibration.

The calibration may be performed in a predetermined number of operations, e.g., two operations due to a difference between the shape of an eye region of a user and a shape of an eye region corresponding to the basic model. The two operations may include a first operation of obtaining data when a user performs the calibration on the basic model and a second operation of updating a parameter to be used in the basic model using the obtained data and adjusting the basic model to a specific model applicable to the user. Using the specific model to estimate the gaze of the user may significantly improve the effect in estimating a gaze of the user; however, using the specific model may degrade and affect the accuracy in estimating gazes of other users.

The basic model may be configured as described above for a geometric model-based approach and an appearance-based approach.

The geometric model-based approach may be a method of estimating a remote gaze based on a center of a pupil and a principle of a corneal reflex. For example, this approach may include determining an algorithm to calculate a direction of the gaze from a measurement feature, for example, a position of the center of the pupil and a position of the corneal reflex, calculating a required measurement feature using eye data, for example, an image, of a user that is obtained using an infrared camera and/or a red, green, and blue (RGB) camera, and calculating the direction of the gaze by applying the calculated measurement feature to the algorithm.

The geometric model-based approach may use a parameter associated with a user. For example, the approach may use, as the parameter, a narrow-angle between a visual axis of a human eye and an optical axis, a distance between a center of a pupil and a center of a curved corneal surface, and the like. To improve accuracy of a result of estimating a gaze of a particular person or user, a parameter of a model for gaze estimation may need to be calculated through calibration. This is because the parameter may not be directly measured, and needs to be calculated by a special calibration apparatus and a calibration algorithm. In addition, in the approach, the calculated measurement feature may need to have relatively high accuracy, and this accuracy may be affected by performance of the specific apparatus, for example, an infrared light source and an infrared camera.

The appearance-based approach may obtain an image of a user using an RGB camera, for example. This approach may extract a feature corresponding to the appearance of the user from the image obtained by capturing the image of the user. Here, to extract the feature, a feature selection method using an artificial model and a feature extraction method based on deep learning may be used. For example, a projection relationship between an input x and a position of a human gaze, for example, a sight tag Y, may be set. To set such projection relationship, a neural network model-based classifier or regressor may be used. In this example, the projection relationship may be represented as $Y=F(x; w)$, for example. In a case of the feature selection method using an artificial model, x denotes a feature extracted from an image of a user, and a feature extracted by an algorithm such as, for example, a scale-invariant feature transform (SIFT). In a case of the feature extraction method based on deep learning, x denotes an input image, F denotes a projection function, and w denotes a parameter of the projection function. The feature extraction method based on deep learning may include two operations: training and test (or estimation). In the training operation, the parameter w of the projection function F may be learned or trained using training data (x, Y) and the projection function F. In the test operation, a gaze estimation result Y' may be obtained using test data x' and the parameter w obtained in the training operation. As deep learning develops, such feature extraction method based on deep learning has become more used among other methods of the appearance-based approach.

As described above, the calibration may include two operations. The two operations may include the first operation of obtaining data when the user gazes at a fixed point, for example, a calibration point or a reference point, in an interactive manner, and the second operation of updating the basic model to the specific model by adjusting a parameter, for example, the parameter w, of the basic model based on the obtained data of the user and a corresponding sight tag Y.

In a case of the basic model configured by the geometric model-based approach, the calibration may be performed to determine a parameter associated with a user, for example, a narrow angle between a visual axis of a gaze of an eye and an optical axis, a distance between a center of a pupil and a center of a curved corneal surface, and the like.

In a case of the basic model configured by the appearance-based approach, the calibration may be performed to newly determine a projection function, and train the parameter w of the projection function. To train the parameter w, deep learning using, for example, support vector regression (SVR) and random forest, may be performed.

However, the geometric model-based approach may use a specific data collecting device, for example, an infrared light source and an infrared camera. Rather, when only an RGB camera is available, gaze estimation based on the geometric model-based approach may not be implemented.

The typical appearance-based approach may have disadvantageous aspects described below.

A first aspect of such disadvantage is as follows: A projection function may need to be determined again through the calibration, and a parameter of the projection function may need to be determined through training. In addition, such a typical process may need to be executed in a mobile device of a user, and the process may need to be performed each time the calibration is performed, and thus consumption of hardware resources may increase. What needs to be noticed is that the process may require collecting data of the user, and the data is related to an issue of personal privacy. To protect personal privacy, the data of the user may need to be transmitted to a server, and computation or calculation may need to be performed using the server.

A second aspect of such disadvantage is as follows: A type of a mapping function that is newly determined through estimation may be limited due to a limited method, for example, the SVR and/or the random forest, that may be used for deep learning, and an estimation method may be restricted thereby. In such a case, a type of a projection function newly determined through estimation may be limited, and an estimation method may be restricted thereby. In such a case, a partial function obtained during the estimation may not be used for training, and thus a prediction effect for a particular person or user may be degraded. That is, the prediction effect for a particular person or user may not be effectively improved through estimation.

A third aspect of such disadvantage is as follows: The usability of a feature extracted through an existing method may be degraded. That is, a feature representation ability of the basic model of the existing method may be degraded, and thus a projection function that is suitable for all users or persons may not be formed. That is, it is not possible to adequately represent features for all the users or persons.

The aspects of the disadvantages described in the foregoing may be generated from what is to be described as follows.

As described above, to reduce the influence of differences in face shapes of different individuals in the result of a gaze estimation, while training the basic model, training may need to be performed to newly determine a projection function of the basic model. To protect personal privacy, estimation and training of the basic model may need to be performed in a mobile device of a user. However, in such a case, consumption of hardware resources of the mobile device may increase.

Figure 2:
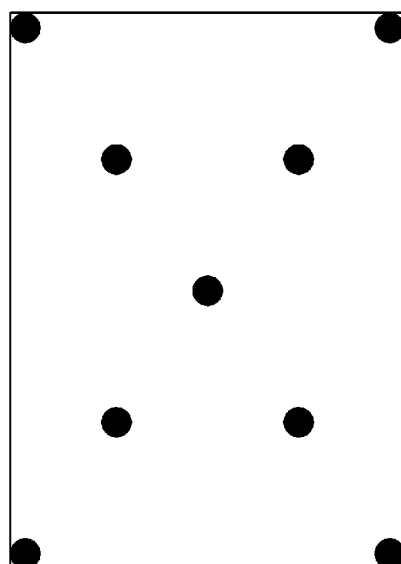
Figure 3:
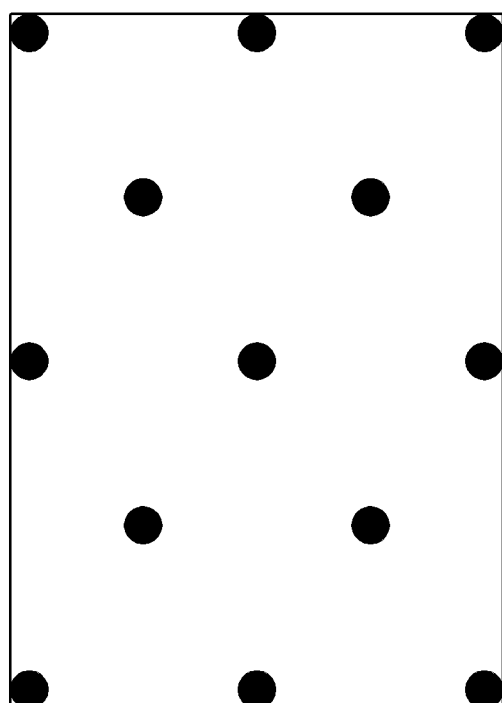

In addition, limited by a method used for deep learning, for example, SVR and random forest, a classifier may operate effectively only when data obtained during estimation satisfies a particular distribution. Thus, only the data satisfying the distribution may be applicable to the method such as the SVR and the random forest. FIGS. 1 through 3 are diagrams illustrating examples of calibration points. In the respective examples, five calibration points, nine calibration points, and thirteen calibration points are illustrated; however, any preset number of calibration points may be used for calibration.

However, there may be a situation in which data of a user obtained during the use of a mobile device, for example, in a test process, and a sight sample corresponding to the data may not be used for estimation. For example, when the user initially uses a personal mobile device, the user may perform personal settings. During the personal settings, the user may click on a specific button. In such a case, when estimation is performed using data obtained when the user clicks on the button and a sight tag corresponding to the button, accuracy of a result of gaze estimation may be improved. However, a portion of data and sight tags that are obtained during the personal settings may be restricted by the method such as the SVR and the random forest. In addition, a remaining portion of the data and the signal tags obtained during the personal settings may not be used to adjust a parameter of the existing basic model, and not to be used to train a specific model.

In the process of training the basic model, there may be a relatively significant difference in the facial shape between sets of data for the training, and thus it may not be easy to obtain an overall optimal value of a parameter of the basic model.

In the process of training the basic model, there may be a relatively significant difference in the eye shape between sets of data for the training, and thus it may not be easy to obtain an overall optimal value of a parameter of the basic model.

A model training part may be used to construct a projection relationship of a model, for example, a projection function $Y=F(x)$. That is, a parameter w of the model that indicates the projection relationship may be trained based on data for the training. The parameter w obtained through the training may be set or fixed, and thus estimation and calibration (which may also be referred to herein as a test) may be performed based on this set parameter w. An operation in the model training part may be an offline operation or an online operation, and more desirably an offline operation, which may be performed when an electronic apparatus such as, for example, a server and a mobile phone, is executed. In addition, an estimation part and a use part may use a trained model for which training is completed, and a parameter w of the trained model in use may not be changed in an operation in the estimation part and the actual use part. Each of an operation in the estimation part and an operation in the actual use part may be an online operation or an offline operation, and more desirably an online operation, which may be performed by an electronic apparatus such as a mobile phone.

A gaze estimation method and apparatus described herein may be applicable to, or representative of, various types of electronic apparatuses, such as, for example, a mobile phone, a tablet personal computer (PC), and a smartwatch. Herein, example embodiments are described as a mobile phone. However, examples are not limited to a mobile phone example.

The example embodiments described herein may improve an existing gaze estimation technology, and implement gaze estimation adaptable to a particular user. In addition, the example embodiments may be applied to reduce or remove an operation of calculating parameters of a neural network model or an operation of retraining the neural network model during calibration of the neural network model that is to be used for the gaze estimation. Thus, it is possible to reduce the consumption of hardware resources. Through the calibration of the neural network model, performance or efficiency of the gaze estimation, for example, accuracy of a result of the gaze estimation, may be improved effectively. In addition, performance or efficiency of gaze estimation for a particular person or user may be improved. The neural network model obtained through the calibration may have a more improved feature extraction capability. Such advantageous effects of the example embodiments may include one or more of the following aspects.

A first technological improvement aspect is as follows: A loss function defined in an approach of extracting a feature based on existing deep learning, for example, an approach based on an eye shape in an image, may degrade a feature extraction capability of a model to be used for gaze estimation. However, according to one or more example embodiments, using a new loss function different from that in the existing approach, it is possible to improve a feature extraction capability of a neural network model to be used for gaze estimation.

A second technological improvement aspect is as follows: In the existing gaze estimation approach, a generally used basic model and a specific model aimed at a specific user may need to be trained. In addition, the specific model may need to be trained in at least a mobile device of the user, and thus a complicated operation may be desired, which may increase resource consumption. However, according to the one or more example embodiments, a structure or architecture of a neural network model suggested herein may calculate a feature difference in a particular order, and a difference in appearance between different users may be removed using the calculated feature difference. In addition, through a classifier obtained through training, calibration and estimation (or a test) may be performed, and thus an operation of training the neural network model during the calibration may be reduced or removed.

A third technological improvement aspect is as follows: According to the example embodiments described herein, data and gaze (or sight) information obtained in a specific environment may be used for calibration, and thus efficiency of the calibration may be improved.

Hereinafter, example embodiments will be described in detail with reference to the accompanying drawings. Regarding the reference numerals assigned to the elements in the drawings, it should be noted that the same elements will be designated by the same reference numerals, wherever possible, even though they are shown in different drawings.

Figure 4:
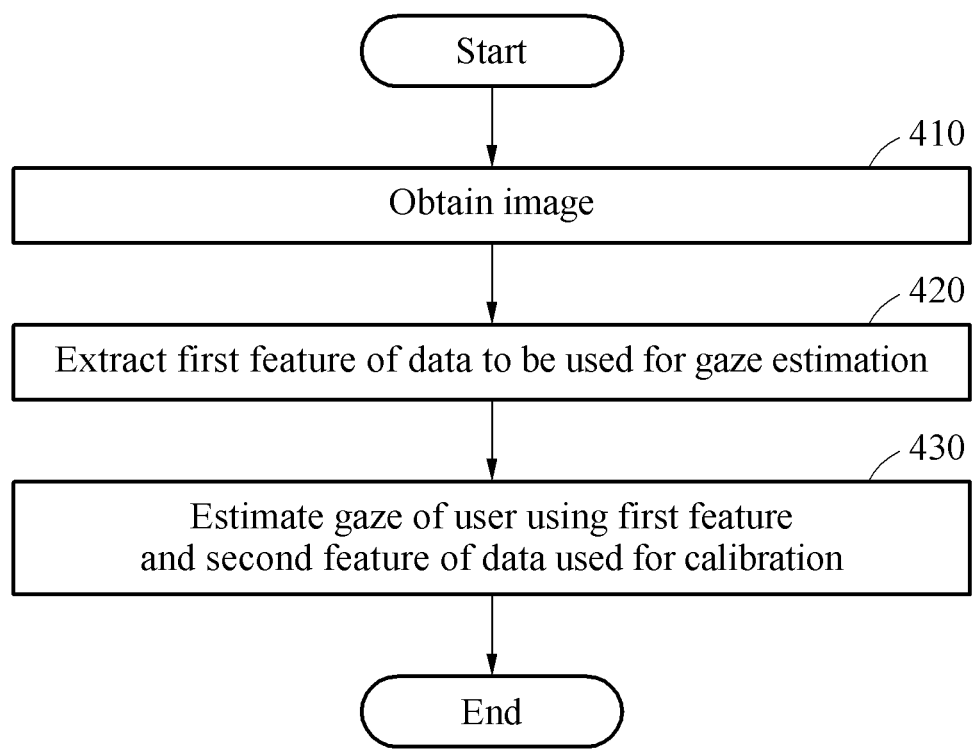
FIG. 4 is a flowchart illustrating an example of a gaze estimation method.

FIG. 4 is a flowchart illustrating an example of a gaze estimation method. The gaze estimation method to be described hereinafter may be performed by an example of a gaze estimation apparatus.

Referring to FIG. 4, in operation 410, the gaze estimation apparatus obtains an image, including an eye region of a user. The gaze estimation apparatus may perform gaze estimation using the obtained image.

In an example, before the gaze estimation, an operation of obtaining a neural network model to be used for the gaze estimation, and an operation of performing calibration on the neural network model may be performed.

The obtaining of the neural network model may include training the neural network model using training data used to train the neural network model. The obtaining of the neural network model may correspond to the training of the neural network model. The training data may include image-related data to be used to train the neural network model and a sight tag for the training. The image-related data may indicate data related to an image to be used to train the neural network model, and the sight tag may also be referred to as a gaze tag. Herein, it is noted that use of the term 'may' with respect to an example or embodiment, e.g., as to what an example or embodiment may include or implement, means that at least one example or embodiment exists where such a feature is included or implemented while all examples and embodiments are not limited thereto.

In an example, data may include data related to the user who gazes at a certain point, for example, a gaze point. For example, the data may include an image of the user, depth data of the user (e.g., depth data of a point positioned in a face region of the user), and the like. In addition, the data may include image-related data, for example, an RGB image or a depth image. The sight tag may be, for example, a two-dimensional (2D) sight tag (e.g., a 2D coordinate value) and a three-dimensional (3D) sight tag (e.g., a 3D coordinate value). The neural network model may include one or more respective network layers to be used for feature extraction and as a classifier, and the network layers may be determined through the training of the neural network model. The one or more network layers for the feature extraction may be used to obtain a feature in operation 420, and the classifier may be used to estimate a gaze in operation 430.

The training data may include, for example, a first user image and a second user image. The first user image and the second user image may be a user image obtained when the same user gazes at a first object and a user image obtained when the same user gazes at a second object, respectively.

The training of the neural network model may include training the neural network that uses, as an input, the first user image, and the second user image, and outputs data of a relationship between relative positions of the first object and the second object. For example, the training of the neural network model may include classifying a label of the sight tag into two categories, determining a loss function corresponding to a sight tag classified into the two categories, and training the neural network model using the image for the training, the sight tag classified into the two categories, and the loss function. In this example, the classifying of the label of the sight tag into the two categories may include determining a coordinate on a coordinate axis of the sight tag used for the training, setting a plurality of nodes at a preset interval based on the coordinate axis, and generating the sight tag classified into the two categories and including a vector having the number of the nodes as a dimension. The value of each dimension of the vector may be determined by the size of the preset interval and the coordinate on the coordinate axis. The loss function may be calculated based on an activation probability that is calculated by a value of each dimension of the vector and training data corresponding to each of the nodes.

Alternatively, there may be a plurality of neural network models. In such an example, the training of the neural network model may include extracting two pairs of samples from the image-related data and the sight tag using a first neural network model and training a second neural network model-based classifier using the extracted two pairs of samples. The extracting of the two pairs of samples may be performed at least twice such that a difference between two sight tags included in two pairs of samples extracted by the extracting at a current extraction time is less than a difference between two sight tags included in two pairs of samples extracted by the extracting at a previous extraction time.

In this example, the training of the second neural network model-based classifier may include extracting features of two sets of image-related data for the training through the trained first neural network model, calculating a feature difference between the features of the two sets of image-related data, and training the second neural network model-based classifier that uses, as an input, the calculated feature difference and outputs two category tags corresponding to the two sets of image-related data.

Before the training of the second neural network model-based classifier, an operation of setting a parameter of a second neural network model based on the first neural network model may be performed. The first neural network model and the second neural network model may have the same network layer for feature extraction.

The training of the second neural network model-based classifier using the two pairs of samples may include training the second neural network model-based classifier using two sets of image-related data included in the two pairs of samples and two category tags corresponding to the two sets of image-related data. The two pairs of samples may correspond to the same user, and each of the samples may include one set of image-related data and one sight tag corresponding to the one set of image-related data. A difference between two sight tags included in the two pairs of samples may be greater than a first threshold value and less than a second threshold value.

The training of the second neural network model-based classifier may further include extracting another two pairs of samples, and training the second neural network model-based classifier using the extracted other two pairs of samples. A difference between two sight tags included in the other two pairs of samples may be greater than a third threshold value and less than a fourth threshold value. The second threshold value may be greater than or equal to the first threshold value, and the third threshold value may be less than or equal to the second threshold value.

During the training of the neural network model, the training may be more effectively performed by processing data and/or a sight tag for the training. The processing may include at least one of converting the sight tag for the training to a tag classified into two categories, or generating, as an image slice, image-related data (e.g., an RGB image) used for the training.

In an example, data to be used for training may include a third user image. The training of the neural network model may include extracting at least one image slice from the third user image, and training the neural network model using the extracted image slice and a sight tag to be used for the training.

In an example, data to be used for estimation may include a fourth user image, and data to be used for calibration may include a fifth user image. Thus, operation 420 of extracting a first feature may include extracting a feature of the fourth user image through the trained neural network model and/or extracting a feature of the fifth user image through the trained neural network model.

The converting of the sight tag for the training to the tag classified into the two categories may include determining a coordinate $Y_a$ on a coordinate axis of the sight tag for the training. Here, $Y_{amin} \leq Y_a \leq Y_{amax}$, in which $Y_{amin}$ and $Y_{amax}$ denote a minimum value and a maximum value of the coordinate $Y_a$, respectively. A plurality of intersection points may be set on the coordinate axis at a preset interval having a size which is bin size, and the tag classified into the two categories having a quantity of the intersection points as a dimension may be generated in the form of a vector. The loss function may be calculated based on the value of each dimension of the vector and an activation probability. The activation probability may be calculated based on training data corresponding to each of the intersection points.

In an example, the training data may include a sixth user image and a sight tag to be used for training. In this example, the training of the neural network model may include extracting, at least, one image slice from the sixth user image, converting the sight tag for the training to a tag classified into two categories, determining a loss function corresponding to the tag classified into two categories, and training the neural network model using the tag classified into two categories and the loss function.

The performing of the calibration on the neural network model may include displaying a calibration point, obtaining a calibration image which is obtained by capturing an image of the user when the user gazes at the displayed calibration point, and performing the calibration on the neural network model using the obtained calibration image.

In the performing of the calibration described in the foregoing, the obtaining of the calibration image may include, when a gesture performed by the user in response to the calibration point is received, determining a distance between the calibration point and an operation point corresponding to the gesture, and determining the calibration image to be an image to be used for the calibration in response to the determined distance being less than a threshold value. The calibration may be performed on the neural network model based on the determined calibration image.

In operation 420, the gaze estimation apparatus extracts a first feature of data to be used for gaze estimation from the image obtained in operation 410. The gaze estimation apparatus may extract the first feature using the neural network model on which the calibration is performed. The image on which the gaze estimation is to be performed may be input to the neural network model, and the first feature may be output from the neural network model. The gaze estimation apparatus may obtain a feature of data to be used for estimation and a feature of data to be used for calibration.

In operation 430, the gaze estimation apparatus performs the gaze estimation using a feature, for example, the first feature, obtained in operation 420. The gaze estimation apparatus may estimate a gaze of the user using the first feature and a second feature of data used for the calibration of the neural network model. The second feature of the data used for the calibration may be extracted using the neural network model. Before performing the gaze estimation, the gaze estimation apparatus may obtain the data to be used for the calibration. For example, when a point is one of calibration points, the gaze estimation apparatus may obtain the data to be used for the calibration of the neural network model based on an action or operation performed by the user in response to the point. The point may include at least one of a point on a screen of an electronic apparatus, a point at a position of a button on the electronic apparatus, or a point having a predetermined relative position with respect to the electronic apparatus, for example.

In an example, to estimate the gaze of the user, the gaze estimation apparatus may estimate a position of a gaze point in a gaze area of the user from the first feature and the second feature using the neural network model. The gaze estimation apparatus may calculate a feature difference between the first feature and the second feature, and estimate an output result of the neural network model corresponding to the calculated feature difference using the neural network model. Based on the estimated output result, the gaze estimation apparatus may calculate a probability that the gaze point is included in each of subareas into which the gaze area is divided, and determine, to be the position of the gaze point, a center position of a subarea having the greatest probability among the probabilities calculated for the subareas.

For example, when the gaze area is on a two-dimensional (2D) plane, the subareas of the gaze area may be obtained by setting two straight lines intersecting perpendicularly at each of the calibration points, and dividing the gaze area into the subareas based on the set straight lines. For another example, when the gaze area is in a three-dimensional (3D) space, the subareas of the gaze area may be obtained by setting three straight lines intersecting orthogonally at each of the calibration points, and dividing the gaze area into the subareas.

To calculate the probability that the gaze point is included in each of the subareas, the gaze estimation apparatus may determine a probability that a coordinate in each dimension of the gaze point is less than or greater than a coordinate in each dimension of each of the calibration points, and calculate the probability that the gaze point is included in each of the subareas based on the determined probability. The gaze estimation apparatus may calculate the probability that the gaze point is included in each of the subareas based on a comparative relationship probability of each of the subareas.

The examples described in the foregoing may be provided for the convenience of description, and not limit a scope of example embodiments of the present disclosure.

As described above, the neural network model may be trained offline, or features of data for calibration may be obtained. The trained neural network model and the obtained features of the data for the calibration may be stored in a storage device. For example, the trained neural network model and the obtained features of the data for the calibration may be stored in an electronic apparatus, for example, a mobile phone, that performs the gaze estimation described above. Thus, estimated data features may be obtained in real-time, and thus the gaze estimation may be performed in real-time.

Figure 5:
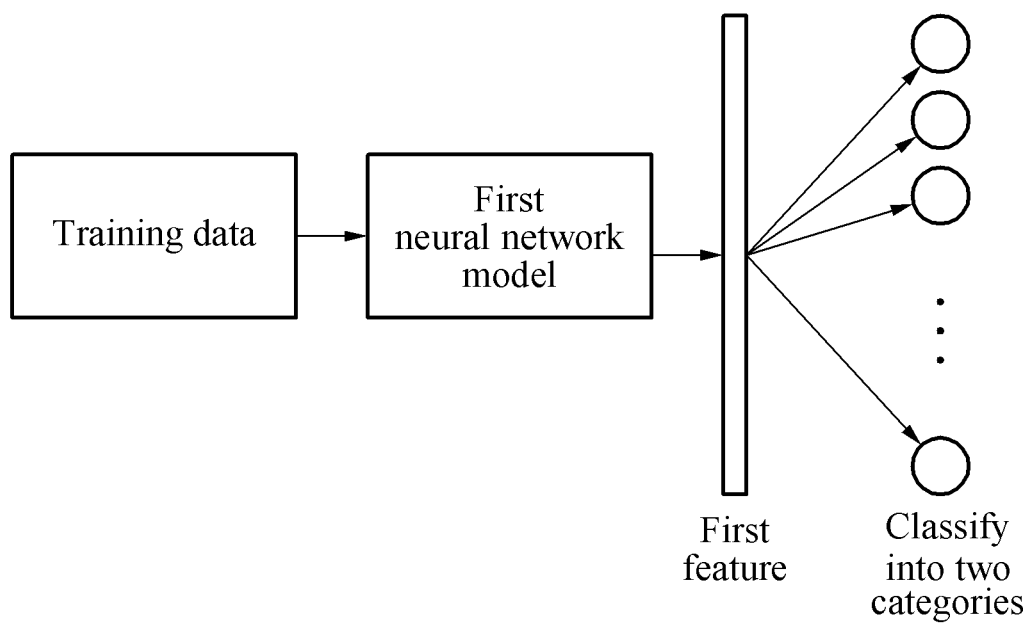
FIG. 5 is a diagram illustrating an example of training a first neural network model.

FIG. 5 is a diagram illustrating an example of training a first neural network model.

Referring to FIG. 5, training data to be used for training may include an image or a photograph. At least one image slice may be extracted from the image to be used for the training, and the extracted image slice may be used to train a first neural network model. In addition, a sight tag to be used for the training may be converted to a tag classified into a number of predetermined categories, e.g., two categories, and the tag classified into the two categories may also be used to train the first neural network model.

When using the tag classified into the two categories to train the first neural network model, the trained first neural network model may include a classifier configured to classify the sight tag into the two categories and a network layer to be used for feature extraction. An input to the network layer to be used for the feature extraction may be the image to be used for the training, and an output from the network layer may be a feature of the image to be used for the training. An input to the classifier may be the feature of the image to be used for the training, and an output from the classifier may be the tag classified into the two categories.

The training of the first neural network model may include a training process A to be described as follows: The training process A may include converting the sight tag to be used for the training to the tag classified into the two categories, determining a first loss function corresponding to the tag classified into the two categories, and training the first neural network model using the image to be used for the training, the tag classified into the two categories, and the first loss function. An objective of the training may be to obtain parameters of the first neural network model that minimizes a resultant value of the first loss function obtainable through the training. The parameters may include a weight parameter of each layer of the first neural network model.

For example, a sight tag Y for training is converted to a tag Y' classified into a series of two categories, and the first neural network model is trained through an image for the training and the tag Y' classified into the two categories. Thus, the first neural network model is trained through at least one image slice extracted or classified from the image for the training, and the tag Y' classified into the two categories. The extracting or classifying the at least one image slice from the image for the training will be described in detail hereafter. For example, a first loss function is determined based on the image for the training (or the at least one image slice obtained through the extracting or the classifying) and the tag Y' classified into the two categories, and the first neural network model is trained conveniently based on the determined first loss function. By training the first neural network model using the tag Y' classified into the two categories, an output of the first neural network model may more readily converge, or speed of convergence thereof may increase. Using the first neural network model trained as described in the foregoing, the first feature of the data (e.g., image) may be extracted.

In an example, the converting of the sight tag for the training to the tag classified into the two categories may include determining a coordinate $Y_a$ on a coordinate axis of the sight tag for the training and setting a plurality of intersection points at a preset interval on the coordinate axis. In this example, $Y_{amin} < Y_a < Y_{amax}$, in which $Y_{amin}$ and $Y_{amax}$ denote a minimum value and a maximum value of the coordinate $Y_a$, respectively. A size of the preset interval may be bin_size. The quantity or number bin_num of the intersection points may correspond to an integer part of a result obtained from $(Y_{amax} - Y_{amin})$/bin_size+1. In this example, the tag classified into the two categories, including a vector with a dimension of bin_num may be generated, and a value of each dimension of the vector may be calculated as represented by Equation 1, for example.

$$Y'_{ai} = \begin{cases} 1 & \text{if } i \times \text{bin\_size} \leq Y_a \\ 0 & \text{if } i \times \text{bin\_size} > Y_a, \end{cases} \quad \text{Equation 1}$$

where, 1≤i≤bin_num.

For example, the coordinate axis may be one axis in a 2D, 3D, or higher dimension coordinate system, and $Y_{amin}$ and $Y_{amax}$ define a range of one coordinate on the one coordinate axis. In this example, the bin_num intersection points, for example, the bin_num intersection points at the same interval of 20 pixels, may be set on the one coordinate axis. A column vector or a row vector in which a value of an element is $Y'_{ai}$ and a dimension is bin_num may be set, and a tag classified into two categories that correspond to the one coordinate on the one coordinate axis may include the column vector or the row vector. A tag classified into two categories that correspond to a sight tag represented by a 2D coordinate may include two vectors, respectively corresponding to an x-axis and a y-axis, and correspond to bin_num_x+bin_num_y+bin_num_z classifiers. Here, bin_num_x, bin_num_y, and bin_num_z denote a dimension of the vector corresponding to the x-axis, a dimension of the vector corresponding to the y-axis, and a dimension of a vector corresponding to a z-axis, respectively.

For example, a sight tag may be represented using a 2D coordinate $(Y_x, Y_y)$, and intersection points may be set based on a coordinate axis on a screen of a mobile phone. In this example, when an upper left angle of the screen of the mobile phone is defined as an origin of coordinates (0, 0), a direction of a lower left angle from a position of the upper left angle of the screen of the mobile phone may correspond to a forward direction on the y-axis or a vertical axis. In this example, a maximum value and a minimum value on a horizontal axis are defined as $Y_{xmax}$ and $Y_{xmin}$, respectively.

In such a coordinate system, the intersection points may be set at an interval of 20 pixels on the x-axis, for example, bin_size_x. The quantity or number bin_num_x of the intersection points on the x-axis may correspond to an integer part of a result obtained from $(Y_{xmax}-Y_{xmin})$/bin_size_x+1. In addition, the intersection points may be set at an interval of 20 pixels on the y-axis, for example, bin_size_y. The quantity or number bin_num_y of the intersection points on the y-axis may correspond to an integer part of a result obtained from $(Y_{ymax}-Y_{ymin})$/bin_size_y+1. From the sight tag of which the coordinate $(Y_x, Y_y)$ is obtained as described in the foregoing, a vector with a dimension of bin_num_x and a vector with a dimension of bin_num_y may be generated. An element $Y'_{xi}$ included in the vector with the dimension of bin_num_x may be represented by Equation 2, for example.

$$Y'_{xi} = \begin{cases} 1 & \text{if } i \times \text{bin\_size\_x} \leq Y_x \\ 0 & \text{if } i \times \text{bin\_size\_x} > Y_x, \end{cases} \quad \text{Equation 2}$$

where, an element $Y'_{yi}$ included in the vector with the dimension of bin_num_y may be represented by Equation 3, for example.

$$Y'_{yi} = \begin{cases} 1 & \text{if } i \times \text{bin\_size\_y} \leq Y_y \\ 0 & \text{if } i \times \text{bin\_size\_y} > Y_y, \end{cases} \quad \text{Equation 3}$$

A tag classified into two categories that corresponds to the sight tag of which the coordinate is $(Y_x, Y_y)$ may include the vector with the dimension of bin_num_x and the vector with the dimension of bin_num_y. The number of classifiers configured to classify the sight tag with the coordinate $(Y_x, Y_y)$ may be bin_num_x+bin_num_y.

In an example, a loss function may be a cross-entropy loss calculated based on a classifier configured to perform such classification into two categories. For example, the loss function may be calculated as represented by Equation 4, for example.

$$\text{Loss}_i = -Y'_{ai} \times \log(P_{ai}) - (1 - Y'_{ai}) \times \log(1 - P_{ai}), \quad \text{Equation 4}$$

$$\text{Loss} = \sum_{i=1}^{bin\_num} \text{Loss}_i,$$

In Equation 4, Loss denotes a loss function. An activation probability $P_{ai}$ of i intersection points may be defined as represented by Equation 5, for example.

$$P_{ai} = \frac{1}{1+e^{-zi}}, \quad \text{Equation 5}$$

where, zi denotes an input of the i intersection points. For example, zi may indicate a portion or an entirety of training data corresponding to the i intersection points.

In an example, the following operations may be further performed. An operation of extracting a sample using training data and a sight tag to be used for training, and an operation of training a second neural network model, which is different from the first neural network model described above using the extracted sample, may be further performed. Alternatively, an operation of training the first neural network model based on the training data and the sight tag for the training, an operation of setting the second neural network model based on the first neural network model, and an operation of training the second neural network model based on a sample extracted through the training data and the sight tag for the training may be further performed. In this example, the sight tag for the training may be converted to a tag classified into two categories, which is to be used for a corresponding neural network model.

For example, when the first neural network model is not trained, the second neural network model may be trained. That is, the training of the second neural network model may include extracting two pairs of samples from image-related data to be used for the training and the sight tag to be used for the training, and training the second neural network model with the extracted two pairs of samples. In this example, the two pairs of samples may correspond to the same user, and each of the samples may include image-related data to be used for the training and a corresponding sight tag. A difference between two sight tags in the two pairs of samples may be greater than a first threshold and less than a second threshold.

For another example, after the first neural network model is trained, the second neural network model may be trained. That is, the training of the neural network model may include converting the sight tag to be used for the training to a tag classified into two categories, determining a loss function corresponding to the tag classified into the two categories, training the first neural network model using the image-related data for the training, the tag classified into the two categories, and the determined loss function, and setting a parameter of the second neural network model based on the trained first neural network model. In this example, the trained second neural network model and the trained first neural network model may have the same network layer to be used for feature extraction. In this example, a classifier of the second neural network model may be trained based on the image-related data for the training and the tag of the two categories corresponding to the image-related data.

In another example, the training of the neural network model may further include an operation of extracting another two pairs of samples through the extracting of the two pairs of samples, and an operation of continuously training the second neural network model using the extracted other two pairs of samples. In this example, a difference between two sight tags in the other two pairs of samples may be greater than a third threshold and less than a fourth threshold. The third threshold may be greater than or equal to the first threshold, and the fourth threshold may be less than or equal to the second threshold. The extracting of the two pairs of samples may be performed at least twice such that a difference between two sight tags in two pairs of samples extracted by the extracting at each extraction time may be less than a difference between two sight tags in two pairs of samples extracted by the extracting at a previous extraction time.

Hereinafter, an example of training the first neural network model and setting the second neural network model based on the trained first neural network model, and then training the second neural network model will be described in detail.

In this example, the training of the neural network model may include a training process B and a training process C to be described as follows: In the training process B, two pairs of samples may be extracted from image-related data to be used for training and a sight tag for the training. The extracted two pairs of samples may correspond to the same user or client, and each of the samples may include one set of image-related data to be used for training and another corresponding sight tag to be used for the training. In this example, a difference between two sight tags in the two pairs of samples may be greater than a first threshold and less than a second threshold. In addition, a function of a positional relationship between two sight tags for the training to be used to represent the two pairs of samples may be used as a second loss function. Using the two pairs of samples and the second loss function, the second neural network may be trained. Here, an objective of the training may be to determine parameters of the second neural network model that may minimize a resultant value of the second loss function. The parameters may include a weight parameter of each layer included in the second neural network model. The parameters of the second neural network model in the training process B may be set based on parameters of the first neural network model trained in the training process A. In addition, the second neural network model and the first neural network model may have the same network layer to be used for feature extraction. The second loss function and the first loss function may be selectively the same.

In an example, the classifier of the second neural network model may be trained through the following operations: For example, the classifier of the second neural network model may be trained through an operation of extracting features of two sets of image-related data to be used for training through the trained first neural network model, an operation of calculating a feature difference between the features of the two sets of image-related data for the training, and an operation of training the classifier of the second neural network model that uses the calculated feature difference as an input and outputs a tag classified into two categories corresponding to the two sets of image-related data for the training. In this example, a feature of image-related data may be a vector, and a feature difference may be a difference between vectors.

In the training process C, another two pairs of samples may be further extracted in the operation of extracting the two pairs of samples. A difference between two sight tags included in the other two pairs of samples may be greater than the third threshold or less than the fourth threshold. The third threshold may be greater than or equal to the first threshold, and the fourth threshold may be less than or equal to the second threshold. The second neural network model may be continuously trained using the other two pairs of samples such that the difference between the two sight tags included in the two pairs of samples may be reduced gradually.

Figure 6:
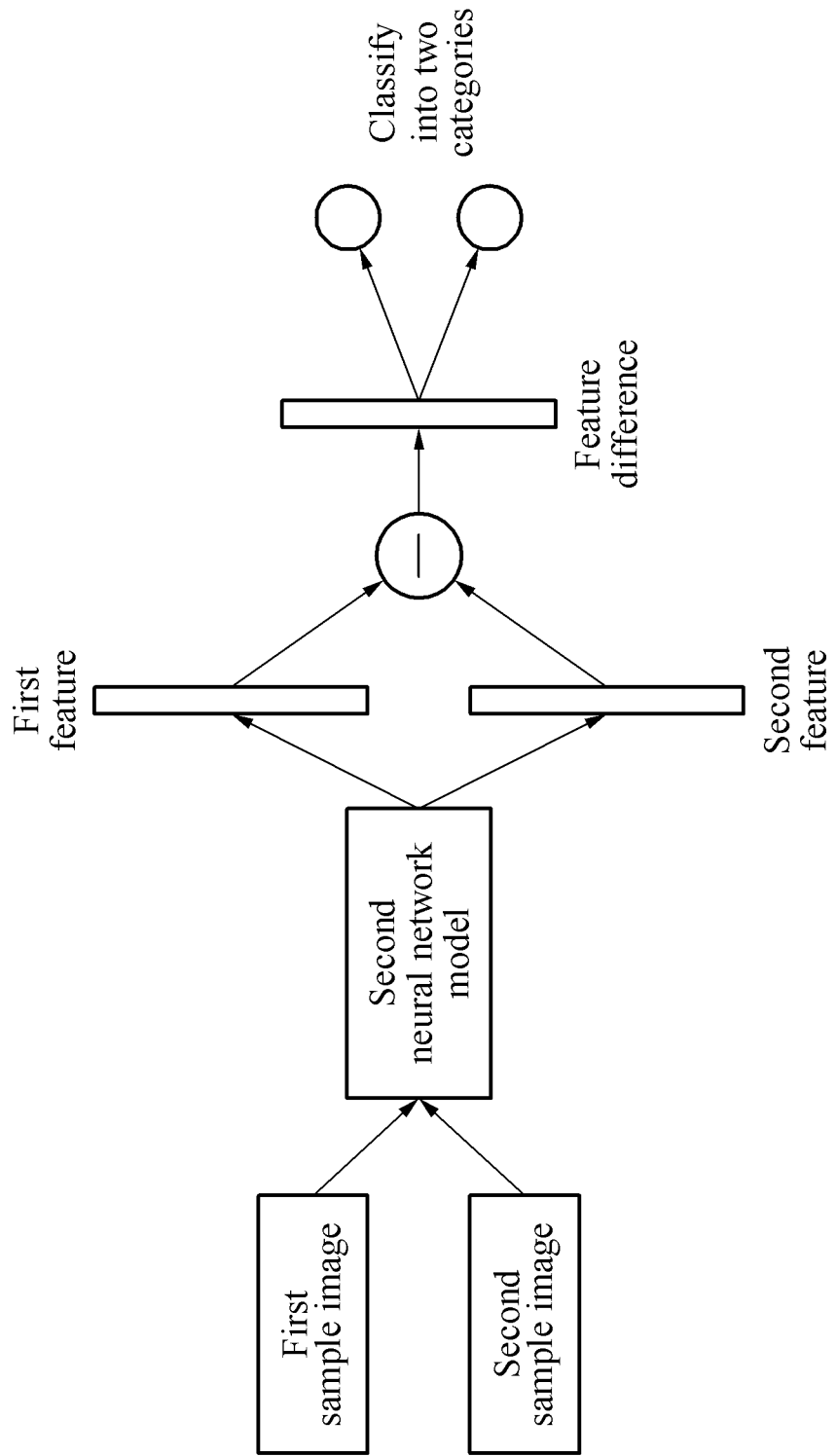
FIG. 6 is a diagram illustrating an example of training a second neural network model.

FIG. 6 is a diagram illustrating an example of training a second neural network model.

In the example of FIG. 6, a network layer of a second neural network model to be used for feature extraction may be trained as described above with reference to FIG. 5. A first sample image and a second sample image may be extracted from image-related data to be used for training and a sight tag to be used for the training, and correspond to the same user. Each of the first sample image and the second sample image may include one set of image-related data for training and another corresponding sight tag for the training. A difference between two sight tags in two pairs of samples, for example, the sample images, may be greater than a first threshold and less than a second threshold.

In the example, the image-related data may correspond to an image, and the image may be an image of a user gazing at a gaze point. For example, when the second neural network model is set based on a first neural network model as described above, a network layer of the second neural network model to be used for feature extraction may be already set. In this example, a classifier of the second neural network model may be trained through the first sample image and the second sample image. A second loss function corresponding to the second neural network model may represent a positional relationship between a sight tag of the first sample image and a sight tag of the second sample image.

The sight tag to be used for training based on the first sample image and the second sample image may be converted to a tag of two categories, and the classifier of the second neural network model may be trained based on the tag of the two categories, and on the first sample image and the second sample image. Here, the classifier of the second neural network model may be a classifier for such classification into two categories, and an input of the classifier may be a feature corresponding to an image. For example, through the network layer to be used for the feature extraction, a first feature of the first sample image may be extracted, and a second feature of the second sample image may be extracted. In this example, a feature difference between the first feature and the second feature may be input to the classifier for the classification into two categories. The input of the classifier for the classification into two categories may indicate a positional relationship between a preset target in a first image (also referred to as the first sample image above) and the target in a second image (also referred to as the second sample image above), when viewed from an angle of the same user, or a positional relationship between a gaze point on a screen corresponding to the first image and a gaze point on the screen corresponding to the second image, when viewed from the angle of the same user. For example, the first image may be an image when the same user views one point on a left side of a screen of a mobile phone, and the second image may be an image when the same user views one point on a right side of the screen of the mobile phone. When viewed from an angle of the same user, the tag classified into the two categories may indicate when the gaze point corresponding to the second image is on one side of the gaze point corresponding to the first image. For example, a tag with a value of 1 may indicate a right side, and a tag with a value of 0 may indicate a left side. The first image and the second image may be two images obtained by a camera installed on the mobile phone when the same user views a predetermined target on the screen of the mobile phone.

In the example, the two images may correspond to the same user, and the classifier for the classification into two categories may be trained using a feature difference between the respective features of the two images. Through this, a deviation that may be caused by a difference in appearance of human beings or users may be removed. Here, an order of inputting the two images may not be restricted. For example, the first sample image may be input first to determine the first feature corresponding to the first sample image, and the second sample image may then be input to determine the second feature corresponding to the second sample image. Alternatively, the second sample image may be input first to determine the second feature corresponding to the second sample image, and the first sample image may then be input to determine the first feature corresponding to the first sample image. Subsequently, the feature difference between the two sample images may be calculated.

A feature obtained through the network layer used for feature extraction may be a vector, and the feature difference may be a difference between vectors. That is, the feature difference may be a vector having, as an element, a difference between corresponding elements between two vectors.

In an example, by extracting an error sample from training data, it is possible to gradually reduce a difference between a sight tag of a sample newly extracted and obtained and a sight tag of a sample previously extracted and obtained. In this example, the second neural network model may be continuously trained using a newly extracted sample. In addition, based on the convergence of the second neural network model, a difference between sight tags of obtained samples may be continuously reduced. In addition, by continuously extracting samples, a new set of training data may be obtained. Further, training samples including a simple one to a complicated one that is input to the second neural network model may be obtained. In general, when a difference between two samples input to the second neural network model increases, a relationship between the two samples may be more readily determined. Here, two or more samples having a significant difference therebetween may be referred to as a simple training sample. However, when the difference between the two input samples decreases, it may not be easy to determine the difference between the two samples. Here, two or more samples having a small difference therebetween may be referred to as a complicated training sample. Thus, the simple training sample and the complicated training sample may respectively indicate a significant difference and a small difference between input samples.

In an example, the image-related data may be an image. In an example, the image-related data may be an image slice extracted from the image. The image slice may include, for example, at least one of an image of a portion of a face, an image of a left eye, or an image of a right eye.

For example, an image, or an image of a user, collected or obtained by a camera may be used as image-related data for training. A gaze or sight may be related to a position of an eye, a posture of a head, and the like, and thus, at least one image slice may be extracted from the collected image. The extracted at least one image slice may be a portion of the image, and each image slice may correspond to a subnetwork of the first neural network model.

Figure 7:
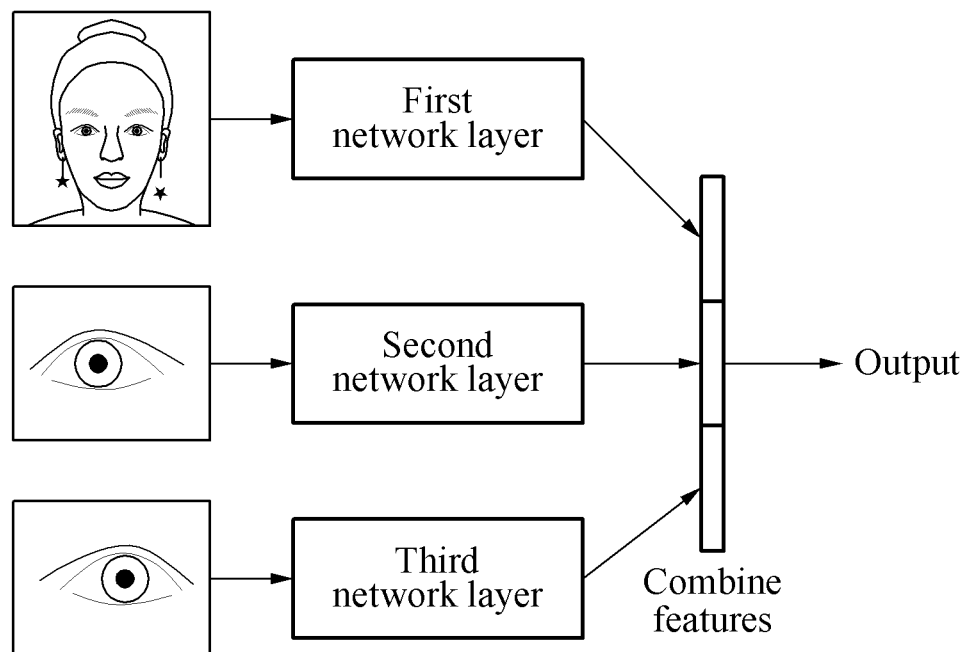
FIG. 7 is a diagram illustrating an example of controlling a neural network model based on an image slice.
Figure 8:
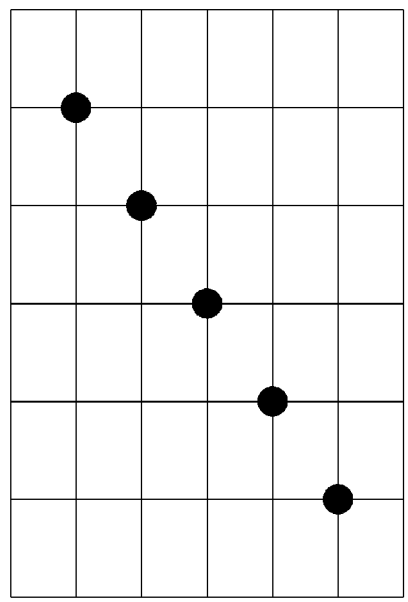
FIGS. 8 through 11 are diagrams illustrating examples of calibration points.
Figure 9:
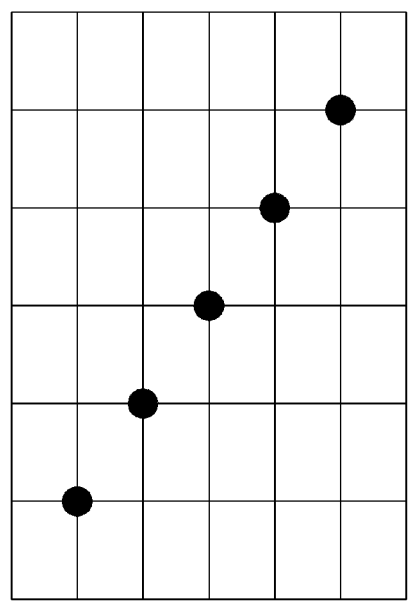
Figure 10:
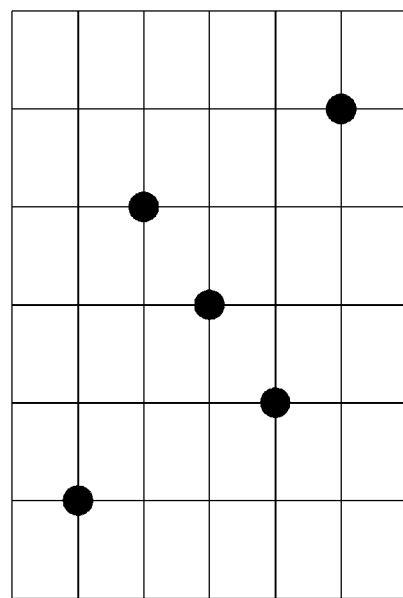
Figure 11:
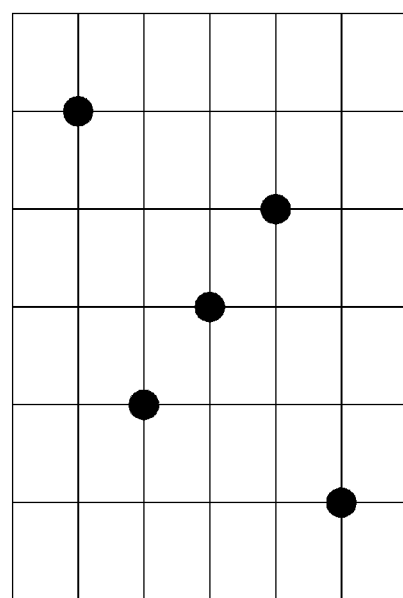

FIG. 7 is a diagram illustrating an example of controlling a neural network model based on an image slice.

In the example of FIG. 7, three image slices, respectively corresponding to a face image, a left-eye image, and a right-eye image are set. The three image slices respectively correspond to three subnetworks. That is, the three image slices respectively correspond to a face network, a left eye network, and a right eye network. In an example, training of a neural network model, calibration, and actual gaze estimation may all include extracting a feature corresponding to an image through the neural network model, or a network layer of the neural network model to be used for feature extraction. In the example of FIG. 7, three features respectively corresponding to the face image, the left eye image, and the right eye image are extracted. The three features may be combined into one feature, and the combined one feature may be output from a corresponding classifier.

In an example of gaze estimation using a mobile phone, image slices may include the face image, the left eye image, and the right-eye image. However, examples are not limited to the illustrated example. For example, gaze estimation may be performed using augmented virtual reality (AVR) glasses. Examples are not limited to an example of collecting image-related data using a single RGB camera, and thus a plurality of cameras may be used. For example, an infrared camera and a near-infrared camera may be used. Here, obtained image-related data may include depth data, and be in a combined form with one type or various types of data being combined. That is, image-related data such as, for example, depth data including information associated with a depth from a face to a camera, or an image slice may include other data to be used for gaze estimation.

The neural network model, for example, a first neural network model and/or a second neural network model, may include a relatively large number of layers and convolution kernels, when compared to an existing neural network model. Here, a method of stacking the convolution kernels may be effective in extracting a feature of an image. In the example, the neural network model has three inputs including an input of the face image, an input of the left eye image, and an input of the right-eye image. The left eye network corresponding to the left-eye image and the right eye network corresponding to the right eye image may share a portion of a network structure, for example, a network layer.

In an example, through parameters indicated below in Tables 1, 2, and 3, the neural network model may be set. Tables 1 and 2 correspond to an example of training the neural network through each image slice, for example, an image slice extracted from an image. Table 3 corresponds to an example of combining features of image slices. However, Tables 1 and 2 are not provided to limit a scope of examples, but to indicate an example desirable neural network model. Thus, a structure or architecture, parameters, input data, and a subnetwork structure of the neural network model may not be limited to what is indicated in the below non-limiting example tables.

TABLE 1

| Layer (face network) | Input width | Input height | No. of input channels | No. of output channels | Convolution kernel width | Convolution kernel height | Output width | Output height |
|---|---|---|---|---|---|---|---|---|
| Conv_11 | 64 | 64 | 3 | 64 | 3 | 3 | 64 | 64 |
| Conv_12 | 64 | 64 | 64 | 64 | 3 | 3 | 64 | 64 |
| Pool_1 | 64 | 64 | 64 | 64 | 2 | 2 | 32 | 32 |
| Conv_21 | 32 | 32 | 64 | 128 | 3 | 3 | 32 | 32 |
| Conv_22 | 32 | 32 | 128 | 128 | 3 | 3 | 32 | 32 |
| Pool_2 | 32 | 32 | 128 | 128 | 2 | 2 | 16 | 16 |
| Conv_31 | 16 | 16 | 128 | 192 | 3 | 3 | 16 | 16 |
| Conv_32 | 16 | 16 | 192 | 192 | 3 | 3 | 16 | 16 |
| Pool_3 | 16 | 16 | 192 | 192 | 2 | 2 | 8 | 8 |
| Conv_41 | 8 | 8 | 192 | 256 | 3 | 3 | 8 | 8 |
| Conv_42 | 8 | 8 | 256 | 256 | 3 | 3 | 8 | 8 |

TABLE 1-continued

| Layer (face network) | Input width | Input height | No. of input channels | No. of output channels | Convolution kernel width | Convolution kernel height | Output width | Output height |
|---|---|---|---|---|---|---|---|---|
| Pool_4 | 8 | 8 | 256 | 256 | 2 | 2 | 4 | 4 |
| Conv_51 | 4 | 4 | 256 | 320 | 3 | 3 | 4 | 4 |
| Conv_52 | 4 | 4 | 320 | 128 | 1 | 1 | 4 | 4 |
| Pool_5 | 4 | 4 | 128 | 128 | 4 | 4 | 1 | 1 |

TABLE 2

| Layer (face network) | Input width | Input height | No. of input channels | No. of output channels | Convolution kernel width | Convolution kernel height | Output width | Output height |
|---|---|---|---|---|---|---|---|---|
| Conv_11 | 64 | 64 | 3 | 64 | 3 | 3 | 64 | 64 |
| Conv_12 | 64 | 64 | 64 | 64 | 3 | 3 | 64 | 64 |
| Pool_1 | 64 | 64 | 64 | 64 | 2 | 2 | 32 | 32 |
| Conv_21 | 32 | 32 | 64 | 128 | 3 | 3 | 32 | 32 |
| Conv_22 | 32 | 32 | 128 | 128 | 3 | 3 | 32 | 32 |
| Pool_2 | 32 | 32 | 128 | 128 | 2 | 2 | 16 | 16 |
| Conv_31 | 16 | 16 | 128 | 192 | 3 | 3 | 16 | 16 |
| Conv_32 | 16 | 16 | 192 | 192 | 3 | 3 | 16 | 16 |
| Pool_3 | 16 | 16 | 192 | 192 | 2 | 2 | 8 | 8 |
| Conv_41 | 8 | 8 | 192 | 256 | 3 | 3 | 8 | 8 |
| Conv_42 | 8 | 8 | 256 | 256 | 3 | 3 | 8 | 8 |
| Pool_4 | 8 | 8 | 256 | 256 | 2 | 2 | 4 | 4 |
| Conv_51 | 4 | 4 | 256 | 320 | 3 | 3 | 4 | 4 |
| Conv_52 | 4 | 4 | 320 | 320 | 3 | 3 | 4 | 4 |
| Conv_53 | 4 | 4 | 320 | 128 | 1 | 1 | 4 | 4 |
| Pool_5 | 4 | 4 | 128 | 128 | 4 | 4 | 1 | 1 |

TABLE 3

| Layer | Number of input intersection points | Number of output intersection points |
|---|---|---|
| Fc1 | 128·3=384 | 256 |
| Classifier | 256 | Bin_num |

In Table 3 above, "Fc1" indicates a network layer for feature extraction, "Classifier" indicates a classifier, and "Bin_num" indicates the number of intersection points.

A feature of data for estimation and/or a feature of data for calibration may be obtained using various methods, as described above.

For example, extracting a feature of data for estimation through a neural network model and/or extracting a feature of data for calibration through the neural network model may include extracting a feature of data for estimation through a second neural network model and/or extracting a feature of data for calibration through the second neural network model.

In a gaze estimation method according to an example embodiment, the estimation may include displaying a calibration point, obtaining, as data for the estimation, an image of a user captured when the user gazes at the displayed calibration point, and performing the estimation based on the obtained data for the estimation.

For example, the obtaining of the image of the user when the user gazes at the calibration point may include determining a distance between the calibration point and an operation point corresponding to a hand gesture performed by the user in response to the calibration point, and obtaining the image of the user as the data for the estimation in response to the determined distance being less than a threshold distance.

In the estimation in the gaze estimation method, the calibration point may be set, and sets of data X_cali_1 through X_cali_N may be obtained when the user gazes at the calibration point. The obtained data may be stored.

FIGS. 8 through 11 are diagrams illustrating examples of calibration points.

In the examples of FIGS. 8 through 11, each example image includes five reference points. However, the number of reference points is not limited to the illustrated examples, and the position of each of the reference points is not limited to the illustrated examples.

In an example, a calibration point may be obtained through calibration. A gaze area may be divided based on a calibration point that is calibrated in advance.

For example, in the case of a mobile phone, a screen of the mobile phone may be divided into six areas, for example, in a horizontal direction and a vertical direction based on a reference point. The six areas may be provided merely as an example for convenience of description, and thus examples are not limited thereto. That is, the screen may be divided into a greater or smaller number of areas than the six areas. In the examples of FIGS. 8 through 11, the screen is divided into 36 subareas by straight lines intersecting at calibration points. However, examples are not limited to each subarea illustrated in FIGS. 8 through 11. That is, examples are not limited to the number of subareas divided on the screen and a method of dividing the screen as illustrated in FIGS. 8 through 11.

In calibration using a mobile phone, a calibration process A may include indicating that a user gazes at a calibration point or a reference point, displayed on a screen of the mobile phone, and establishing an interaction or exchange between the mobile phone and the user. Such process may include indicating that the user gazes at the calibration point displayed on the screen and clicks the calibration point, receiving a clicked position on the screen, determining a distance between the clicked position and the calibration point when the click on the screen is received, determining the click to be a click at the calibration point in response to the determined distance being less than a threshold distance value, for example, 100 pixels, determining that the user gazes at the calibration point, and obtaining an image of the user through a camera. Meanwhile, another calibration point may be displayed on the screen, and the process may include indicating that the user gazes at the other calibration point and clicks at the other calibration point. When a distance between the other calibration point and a clicked position on the screen is greater than or equal to a threshold distance value, the process may include determining that there is no calibration effect and informing the user that the user needs to gaze at and click at the calibration point again.

The example described above in relation to the mobile phone may be provided for the convenience of description, and thus example embodiments may be implemented or realized in other devices or apparatuses. Here, the described examples of displaying the calibration point, performing the interaction or exchange between the user and the mobile phone, and determining whether the calibration is effective or not may be considered to be desirable. However, examples are not limited to the examples described above, and other operations may also be performed.

In an example, in a calibration process B, features feat_1 through feat_N may be extracted from sets of data X_cali_1 through X_cali_N using a neural network model, and the extracted features may be stored. The neural network model may be a first neural network model or a second neural network model, or more desirably the second neural network model.

Alternatively, a feature of data may be extracted offline or not in real-time. That is, for example, when the training of the neural network model is not yet performed, the feature of the data may be extracted in advance and stored.

Figure 12:
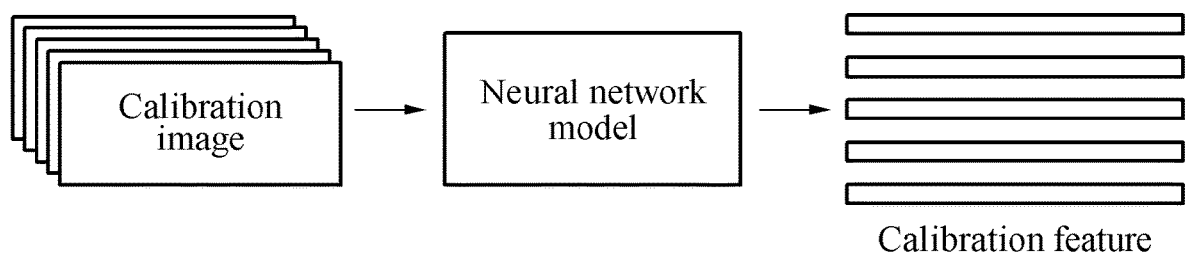
FIG. 12 is a diagram illustrating an example of extracting a calibration feature in a calibration process.

FIG. 12 is a diagram illustrating an example of extracting a calibration feature in a calibration process.

Referring to FIG. 12, data for estimation in feature extraction may correspond to a calibration image. A calibration feature, which is a feature of the calibration image, may be extracted using a neural network model, for example, a second neural network model. The extracted calibration feature may also be referred to as an estimated feature.

In an example, estimating a gaze of a user may include an operation of estimating a position of a gaze point in a gaze area through the neural network model based on an obtained feature of data for calibration and an obtained feature of data for estimation.

In this example, the estimating of the gaze of the user may include calculating a feature difference between an extracted feature of the data for the calibration and an extracted feature of the data for the estimation, estimating an output result of a classifier corresponding to the calculated feature difference, calculating a probability that an output result of a classifier corresponding to the data for the calibration based on the estimated output result is included in each of subareas into which the gaze area is divided, and determining, to be the gaze point of the user, a center of a subarea having a highest probability among the calculated probabilities.

As a non-limiting example, when the gaze area is on a 2D plane, the gaze area may be divided as follows: In this example, two straight lines intersecting perpendicularly at each calibration point may be set based on each calibration point, and the gaze area may be divided into a plurality of subareas based on each of the set straight lines.

As another non-limiting example, when the gaze area is in a 3D space, the gaze area may be divided as follows: In this example, three straight lines intersecting orthogonally at each calibration point may be set based on each calibration point, and the gaze area may be divided into a plurality of subareas based on each of the set straight lines.

In such an example, the calculating of the probability that the gaze point corresponding to the data for the calibration is included in each of the subareas into which the gaze area is divided may include determining a probability that a coordinate of each dimension of the gaze point is greater than or less than a coordinate of each dimension of each calibration point for each output result of a classifier corresponding to each calibration point, and calculating the probability that the gaze point is included in each of the subareas based on the determined probability.

For example, the probability that the gaze point corresponding to the data for the calibration is included in each of the subareas may be calculated using a comparative relationship probability based on a corresponding reference point of each of the subareas.

For example, before the estimating of the gaze is performed using an obtained feature, a particular point may be used as one of calibration points based on an action or gesture performed by the user in response to the point. This point may include at least one of a point on a screen of a device, a button on the device, or a point that determines a relative position with respect to the device.

In the example, the probability, or $P_{area}$, that the gaze point corresponding to the data for the calibration is included in each of the subareas may be calculated as represented by Equation 6, for example.

$$P_{area} = \sum_{i=1}^{cali\_num+1} P_{area_i} \qquad \text{Equation 6}$$

In Equation 6, $P_{area_i}$ denotes a relative comparative relationship probability of i calibration points in each of the subareas, and cali_num denotes the number of calibration points.

In the example, when new data is obtained, the estimating of the gaze-based on an extracted feature may further include obtaining a feature of the new data, combining the feature of the new data and the previously obtained feature of the data for the estimation, recalculating a feature difference between the feature of the data for the estimation and a combined feature obtained through the combining, estimating an output result of a new classifier corresponding to the recalculated feature difference, recalculating a probability that the gaze point corresponding to the data for the calibration is included in each of the subareas, and determining, to be the estimated gaze point, a center of a subareas having the highest probability among the recalculated probabilities.

For example, when the new data includes data for a new estimation, the gaze area may be divided again into a plurality of subareas based on an existing calibration point and a calibration point corresponding to the data for the new estimation. In this example, the recalculating of the probability may include recalculating a probability that the gaze point corresponding to the data for the calibration is included in each of the subareas into which the gaze area is divided again. These operations described above may be performed in one case, for example, when new data and a calibration point corresponding to the new data are estimated again, when an operation or action is performed on a specific button, and when an operation or action is performed for a particular position.

When using a trained neural network model, the operation of calculating the feature difference between the extracted feature of the data for the calibration and the extracted feature of the data for the estimation, the operation of estimating the output result of the classifier corresponding to the calculated feature distance using the trained neural network model, the operation of calculating the probability that the gaze point corresponding to the data for the calibration is included in each of the subareas into which the gaze area is divided based on the estimated output result of the classifier, and the operation of determining the center of the subarea having the highest probability to be the gaze point may be performed.

In the example, when new data is obtained, the estimating of the gaze through using an obtained feature may further include extracting a feature of the new data using the trained neural network model, combining the extracted feature of the new data and the previously extracted feature of the data for the estimation, recalculating a feature difference between the feature of the data for the estimation and a combined feature obtained through the combining, estimating an output result of a new classifier corresponding to the recalculated feature difference using the trained neural network model, calculating a probability that the gaze point corresponding to the data for the calibration is included in each of the subareas based on the output result of the new classifier, and determining, to be the estimated gaze point, a center of a subarea having a highest probability among the calculated probabilities.

When using a trained second neural network model, the estimating of the gaze through an obtained feature may include calculating a feature difference between the feature of the data for the calibration that is extracted by the second neural network model and a feature of the data for the estimation that is extracted by the second neural network model, estimating an output result of a classifier corresponding to the feature difference calculated using the trained second neural network model, calculating a probability that the gaze point corresponding to the data for the calibration is included in each of the subareas based on the estimated output result of the classifier, and determining, to be the estimated gaze point, a center of a subarea having the highest probability among the calculated probabilities.

In the example, when new data is obtained, the estimating of the gaze through an obtained feature may further include extracting a feature of the new data using the trained second neural network model, combining the feature of the new data and a previously extracted feature of the data for the estimation, recalculating a feature difference between an extracted feature of the data for the calibration and a combined feature obtained through the combining, estimating an output result of a new classifier corresponding to the recalculated feature difference using the trained second neural network model, recalculating a probability that the gaze point corresponding to the data for the calibration is included in each of the subareas based on the estimated output result of the new classifier, and determining, to be the estimated gaze point, a center of a subarea having a highest probability among the recalculated probabilities.

Figure 13:
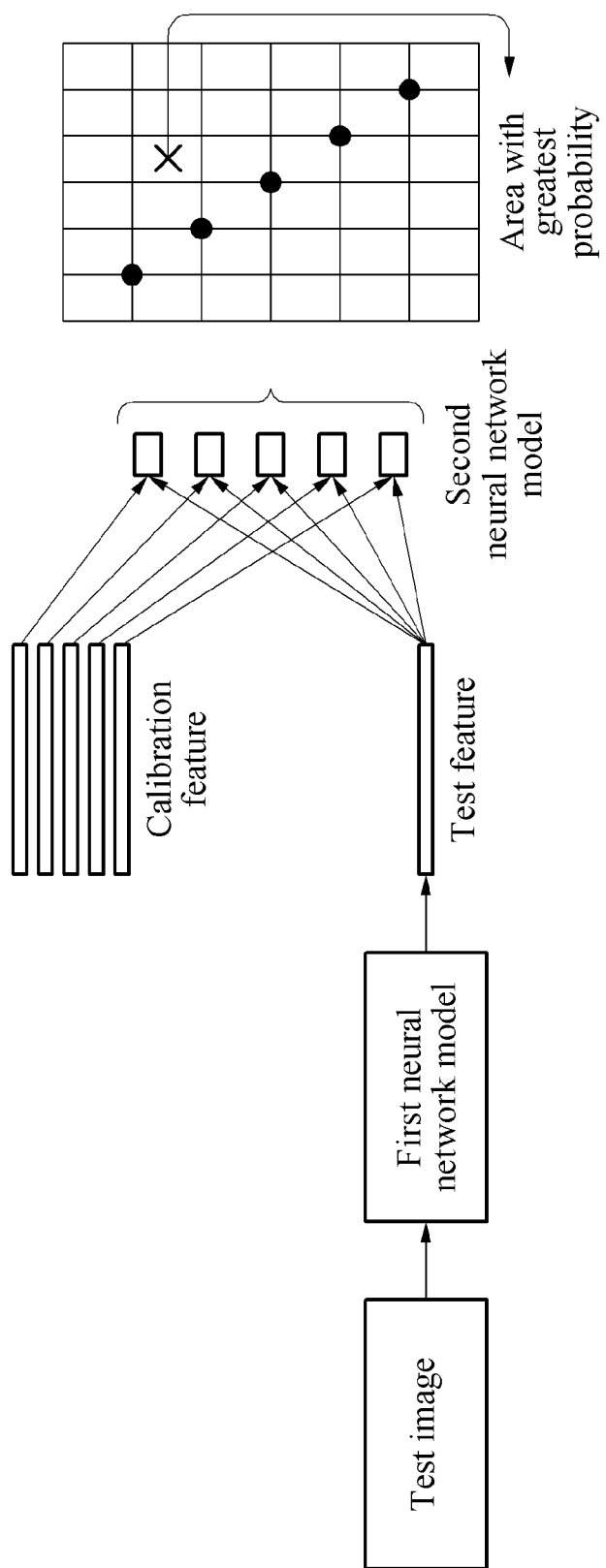
FIG. 13 is a diagram illustrating an example of performing gaze estimation using an extracted calibration feature.

FIG. 13 is a diagram illustrating an example of performing gaze estimation using an extracted calibration feature.

In the example of FIG. 13, a test may include obtaining an image of a user through a camera, for example, and estimating a current gaze of the user based on the obtained image. In a test process A, when the user gazes at a point of interest, which is referred to herein as a gaze point, a test image may be collected through the camera, and a test feature feat_X corresponding to the collected image may be extracted using a first neural network model. The extracting may correspond to extracting a feature in a test step in which an image may be collected in real-time, and the test feature feat_X corresponding to the collected image may be extracted. For example, in a case of a mobile phone, an image of a user may be obtained in real-time through a camera of the mobile phone, and a feature may be extracted in real-time from the obtained image of the user.

In a test process B, feature differences diff_1 through diff_N between the test feature feat_X and previously obtained calibration features feat_1 through feat_N may be calculated. Here, a test feature or a calibration feature may be represented in the form of a vector, and a feature difference may be a difference between vectors. Using a second neural network model, a result of classifying the feature differences diff_1 through diff_N by a classifier configured to perform classification into two categories may be output. Through this, a comparative relationship probability between an image to be used for gaze estimation, for example, the test image collected in the test process A, and one of images X_cali_1 through X_cali_N obtained through calibration may be obtained. The comparative relationship probability may be construed as being a probability that a feature (or a test feature) of an image to be used for estimation hat is obtained by a classifier is greater than or less than a feature (or a calibration feature) of an image to be used for calibration. The feature differences may be calculated in a predetermined order. For example, a difference Diff_i may be obtained by subtracting, from the test feature feat_X corresponding to the collected test image, each of the features feat_1 through feat_N of the image obtained during the calibration. For example, Diff_i=feat_X−feat_i, in which 1≤i≤N and N denotes a natural number.

In a test process C, when a gaze area is divided into a plurality of subareas based on calibration points, a probability that a gaze point (e.g., the current gaze point of the user) corresponding to an image for calibration is included in each of the subareas may be calculated based on the comparative relationship probability. A center point of a subarea having the greatest probability, cumulative probability value, or expected probability value may be determined to be the gaze point of the user.

As described above, referring to FIG. 13, a feature, for example, a test feature, is extracted from an image to be used for estimation, for example, a test image, through a neural network model, for example, a second neural network model. In addition, the test feature and a calibration feature obtained from an image to be used for calibration may be input together to a corresponding classifier, for example, the second neural network model. A feature difference between the test feature and the calibration feature may be obtained, and a probability, for example, a comparative relationship probability, that corresponds to the feature difference may be output through the classifier.

Figure 14:
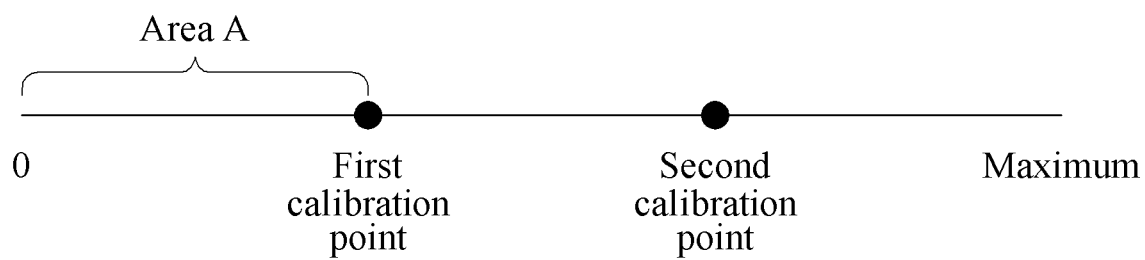
FIG. 14 is a diagram illustrating an example of dividing a gaze area based on a calibration point.

FIG. 14 is a diagram illustrating an example of dividing a gaze area based on a calibration point.

Referring to FIG. 14, a line on an axis of each of calibration points may be divided into two portions, for example. A probability P_i, or a comparative relationship probability, that is output from a classifier may indicate a probability $P\_i\_L$ that a coordinate of a gaze point is less than or equal to coordinates of i calibration points, and a probability $P\_i\_G$ that the coordinate of the gaze point is greater than the coordinates of the i calibration points. In this example, $P\_i\_L+P\_i\_G=1$. For example, $P\_1$ may indicate a probability $P\_2\_L$ that the coordinate of the gaze point is less than or equal to a coordinate of a first calibration point, and a probability $P\_2\_G$ that the coordinate of the gaze point is greater than a coordinate of a second calibration point.

A probability $P_{area}$ that a gaze point corresponding to an image to be used for calibration is included in each of subareas, for example, an area A between a coordinate origin and a first calibration point as illustrated may be calculated as represented by Equation 7, for example.

$$P_{area} = \sum_{i=1}^{cali\_num+1} P_{area_i} \quad \text{Equation 7}$$

In Equation 7, $P_{area_i}$ denotes a relative comparative relationship probability of a calibration point i in each of the subareas. Referring to FIG. 15, $P_{area_i}=P\_i\_L$ when a subarea is on the left side of the calibration point i, and $P_{area_i}=P\_i\_G$ when the subarea is on the right side of the calibration point i. In addition, cali_num denotes the number of calibration points.

As illustrated in FIG. 15, a probability corresponding to the area A may be $P\_2\_L+P\_1\_L$, and a probability corresponding to an area between the first calibration point and the second calibration point may be $P\_2\_L+P\_1\_G$. In addition, a probability corresponding to an area between the second calibration point and a maximum value may be $P\_2\_G+P\_1\_G$.

For example, in a case of gaze estimation through a mobile phone, a coordinate (Y_x, Y_y) of a gaze point on a screen of the mobile phone at which a user gazes may need to be estimated. In this example, a gaze area may be divided into subareas based on calibration points on an x-axis and a y-axis, and an area having the greatest probability that Y_x is positioned on the x-axis and an area having the greatest probability that Y_y is positioned on the y-axis may be calculated. In this example, a center position, for example, a position indicated as X in FIG. 13, of a subarea defined by the subarea having the two greatest probabilities may be determined to be a position of the gaze point.

In a test process D, when an image to be used for new gaze estimation and a corresponding sight tag are obtained during a use process, for example, an estimation operation and an installation operation of an electronic apparatus, a feature corresponding to the image for the new gaze estimation and the sight tag may be extracted again, and the extracted feature and an existing feature feat_i may be combined. For example, the features may be combined by adding vectors. When the image for the new gaze estimation and the sight tag are obtained, a new feature in which the extracted feature and the existing feature are combined may be obtained. Using the combined feature, a test, for example, the test process A, the test process B, and the test process C may be performed. Through this, the accuracy of a result of the test may be improved.

While the test, for example, the test process A, the test process B, and the test process C, is being performed using the combined feature, a screen may be divided again using an existing calibration point and a newly added calibration point.

Figure 16:
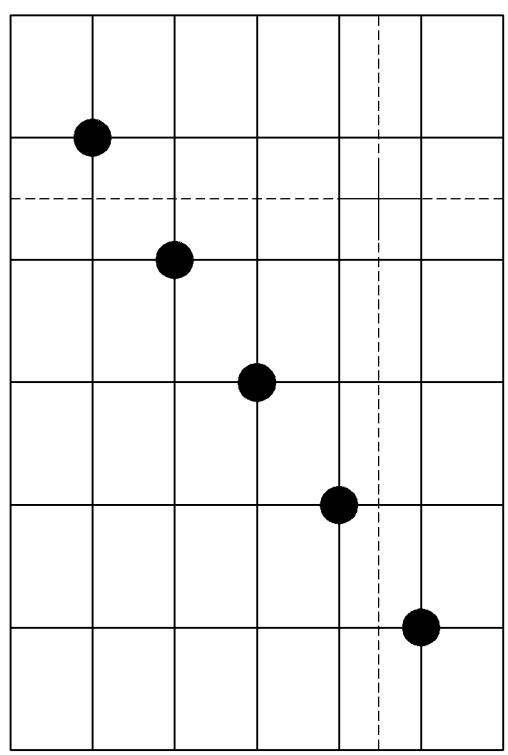
FIG. 16 is a diagram illustrating an example of newly dividing a gaze area based on a calibration point.

FIG. 16 is a diagram illustrating an example obtained by newly dividing a gaze area.

Referring to FIG. 16, there are two straight lines intersecting perpendicularly at each of existing calibration points (indicated by solid lines in FIG. 16), and two straight lines intersecting perpendicularly at each of newly added calibration points (indicated by broken lines in FIG. 16, and intersecting two broken lines indicated by a solid line). New subareas may be obtained by dividing a gaze area again, for example, a screen, using these straight lines. Through this, a subarea having the greatest probability that a gaze point is positioned may be determined among the new subareas.

By performing one of the following operations, a newly added calibration point and new data corresponding to the newly added calibration point may be obtained. A user may click on a button of a mobile phone, or perform an action or gesture in response to a certain point. The point may include at least one of a point on a device screen, a button on the device, or a button having a predetermined relative position with respect to the device.

In a feature extraction step, a difference in appearance may be removed based on a feature difference. Thus, in a gaze estimation step, training a neural network model may not be desired, and thus the gaze estimation step may be simplified, and a computation or calculation amount of an electronic apparatus such as a mobile phone may be reduced. When a new calibration point is obtained, data corresponding to the new calibration point may affect a result of calibration. Due to the addition of the data corresponding to the new calibration point, a gaze area may be divided more finely, and thus accuracy of a result of gaze estimation may be improved.

Figure 17:
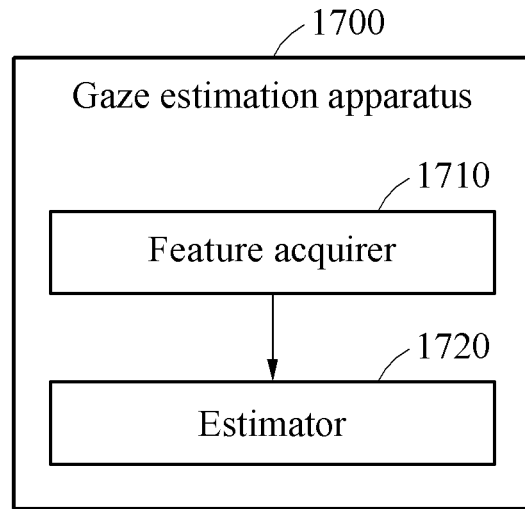
FIG. 17 is a diagram illustrating an example of a gaze estimation apparatus.

FIG. 17 is a diagram illustrating an example of a gaze estimation apparatus.

Referring to FIG. 17, a gaze estimation apparatus 1700 includes a feature acquirer 1710 configured to obtain a feature of data to be used for calibration and a feature of data to be used for gaze estimation, and an estimator 1720 configured to perform the gaze estimation using the obtained feature.

In an example, the gaze estimation apparatus 1700 may further include a model trainer to be used to obtain a neural network model. The feature acquirer 1710 may extract a feature of data to be used for calibration through the neural network model and/or a feature of data to be used for estimation through the neural network model. In addition, the model trainer may train the neural network model using data to be used for training.

In an example, the data to be used for the training, or training data to be used for the training, may include a first user image and a second user image. The first user image and the second user image may be an image obtained when the same user gazes at a first object and an image obtained when the same user gazes at a second object, respectively. The model trainer may train the neural network model that uses, as an input, the first user image, and the second user image and outputs relative positions of the first object and the second object.

In an example, the training data may include image-related data to be used for the training and a sight tag to be used for the training. The model trainer may convert the sight tag for the training to a tag classified into two categories, determine a loss function corresponding to the tag classified into the two categories, and train a first neural network model through the image-related data, the tag classified into the two categories, and the loss function. In this example, the model trainer may determine a coordinate $Y_a$ on a coordinate axis of the sight tag for the training, and set a plurality of intersection points at a preset interval on the coordinate axis. Here, $Y_{amin} \leq Y_a \leq Y_{amax}$, in which $Y_{amin}$ and $Y_{amax}$ denote a minimum value and a maximum value of $Y_a$, respectively. The model trainer may set the intersection points at the preset interval on the coordinate axis, and a size of the preset interval may be bin_size. The model trainer may generate the tag classified into the two categories in the form of a vector having a quantity or number of the intersection points as a dimension. A value of each dimension of the vector may be determined based on the size of the interval and the coordinate $Y_a$, and the loss function may be calculated based on the value of each dimension of the vector and an activation probability. The activation probability may be calculated based on data to be used for the training corresponding to each of the intersection points.

In an example, the training data may include image-related data to be used for the training and a sight tag to be used for the training. The model trainer may extract two pairs of samples from the image-related data for the training and the sight tag for the training, and train the second neural network model with the extracted two pairs of samples. The two pairs of samples may correspond to the same user or client, and each of the samples may include one set of image-related data to be used for the training and another corresponding sight tag to be used for the training. A difference between two sight tags in the two pairs of samples may be greater than a first threshold and less than a second threshold.

In an example, the model trainer may extract another two pairs of samples through the extracting of the two pairs of samples. In this example, a difference between two sight tags in the other two pairs of samples may be greater than a third threshold and less than a fourth threshold. The third threshold may be greater than or equal to the first threshold, and the fourth threshold may be less than or equal to the second threshold. The model trainer may perform the extracting of the two pairs of samples at least twice such that a difference between two sight tags in two pairs of samples extracted by the extracting at each extraction time is less than a difference between two sight tags in two pairs of samples extracted by the extracting at a previous extraction time.

In an example, before training the second neural network model, the model trainer may further set a parameter of the second neural network model based on the first neural network model. In this example, the second neural network model and the first neural network model may have the same network layer to be used for feature extraction. The model trainer may train a classifier of the second neural network model using two sets of image-related data to be used for the training, and two tags classified into two categories and corresponding to the two sets of image-related data for the training, of the two pairs of samples.

In an example, the model trainer may extract a feature of the two sets of image-related data for the training through the trained first neural network model. The model trainer may calculate a feature difference between features of the two sets of image-related data for the training. The model trainer may train the classifier of the second neural network model that uses, as an input, the calculated feature difference and outputs a corresponding tag classified into two categories.

The feature acquirer 1710 may extract a feature of data to be used for calibration through the second neural network model, and/or extract a feature of data to be used for gaze estimation through the second neural network model.

The estimator 1720 may estimate a position of a gaze point in a gaze area through the neural network model based on the extracted feature of the data for the gaze estimation, and the extracted feature of the data for the calibration.

In an example, the estimator 1720 may calculate a feature difference between the feature of the data for the gaze estimation and the feature of the data for the calibration. The estimator 1720 may estimate an output result of a classifier corresponding to the feature difference calculated using the neural network model, and calculate a probability that the gaze point corresponding to the data for the gaze estimation is included in each of the subareas into which the gaze area is divided. The estimator 1720 may then determine, to be a position of the gaze point, a center position of a subarea having a greatest probability among the calculated probabilities.

For example, when the gaze area is on a 2D plane, the subareas of the gaze area may be obtained by setting two straight lines intersecting perpendicularly at each calibration point, and dividing the gaze area into the subareas based on the set straight lines. When the gaze area is in a 3D space, the subareas of the gaze area may be obtained by setting three straight lines intersecting orthogonally at each calibration point, and dividing the gaze area into the subareas based on the set straight lines.

In an example, the estimator 1720 may calculate a probability that a coordinate in each dimension of the gaze point is less than or greater than a coordinate in each dimension of each calibration point based on an output result of a classifier corresponding to each calibration point, and calculate the probability that the gaze point is included in each of the subareas based on the calculated probability.

In an example, the estimator 1720 may calculate the probability that the gaze point is included in each of the subareas based on a comparative relationship probability of each of the subareas that indicates a relationship between relative positions of the subareas.

In another example, before performing the gaze estimation using an obtained feature, the gaze estimation apparatus 1700 may perform the calibration. When a certain point is set to be one of the calibration points based on an action or gesture performed by a user in response to the point, the gaze estimation apparatus 1700 may obtain data to be used for the calibration. For example, the point may include at least one of a feature point on a screen of a device, a specific button on the device, or a feature point at a relative position from the device. The gaze estimation apparatus 1700 may display at least one calibration point and obtain, as the data to be used for the calibration, an image of the user obtained when the user gazes at the calibration point. The gaze estimation apparatus 1700 may perform the calibration based on the data to be used for the calibration. For example, in response to a received hand gesture corresponding to the calibration point, the gaze estimation apparatus 1700 may determine a distance between the calibration point and an operation point corresponding to the hand gesture, and obtain the image of the user to be the data to be used for the calibration in response to the determined distance being less than a threshold distance.

For a detailed method or operation to be performed by the gaze estimation apparatus 1700, reference may be made to the descriptions provided above with reference to FIGS. 1 through 16, and a related description will be omitted here for brevity.

A non-transitory computer-readable storage medium in which a computer program is stored may also be provided herein. When the computer program is executed by a processor, a gaze estimation method described herein may be performed.

Figure 18:
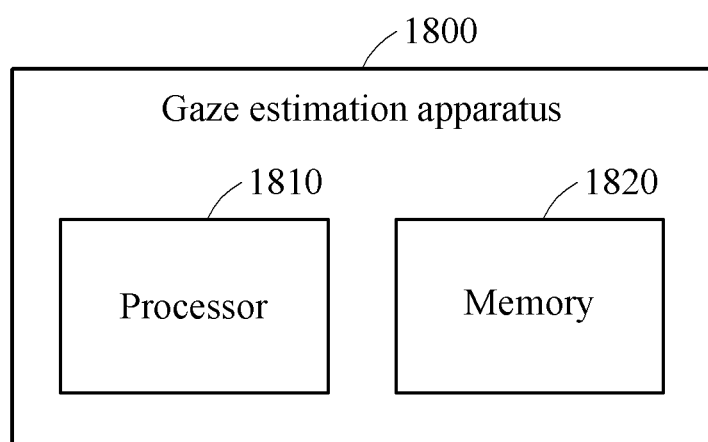
FIG. 18 is a diagram illustrating another example of a gaze estimation apparatus.

FIG. 18 is a diagram illustrating another example of a gaze estimation apparatus.

A gaze estimation apparatus 1800 may be configured to estimate a gaze of a user based on an image obtained by capturing an image of the user, and output a result of estimating the gaze of the user to determine a position at which the user gazes. The gaze estimation apparatus 1800 may perform one or more, or all of the operations, steps, processes, or methods described above in relation to gaze estimation. Based on the result of estimating the gaze, a corresponding function may be performed. For example, based on the result of estimating the gaze, an application corresponding to the position at which the user gazes may be executed.

Referring to FIG. 18, the gaze estimation apparatus 1800 includes at least one processor 1810 and a memory 1820. The memory 1820 may be connected to the processor 1810, and store instructions readable or executable by the processor 1810, and data to be processed by the processor 1810 or data processed by the processor 1810.

According to an example, the gaze estimation apparatus 1800 may further include a camera, and the camera may obtain an image including an eye region of the user by capturing an image of a front side of the camera.

The processor 1810 may perform one or more, or all of the operations, steps, processes, or methods described above in relation to gaze estimation with respect to FIGS. 1 through 17. For example, the processor 1810 may control the gaze estimation apparatus 1800 to extract a first feature of data to be used for gaze estimation from an image including an eye region of a user, and estimate a gaze of the user using the extracted first feature and a second feature of data used for calibration of a neural network model. For more detailed operations of the processor 1810, reference may be made to what is described above in relation to the gaze estimation with respect to FIGS. 1 through 17.

Figure 19:
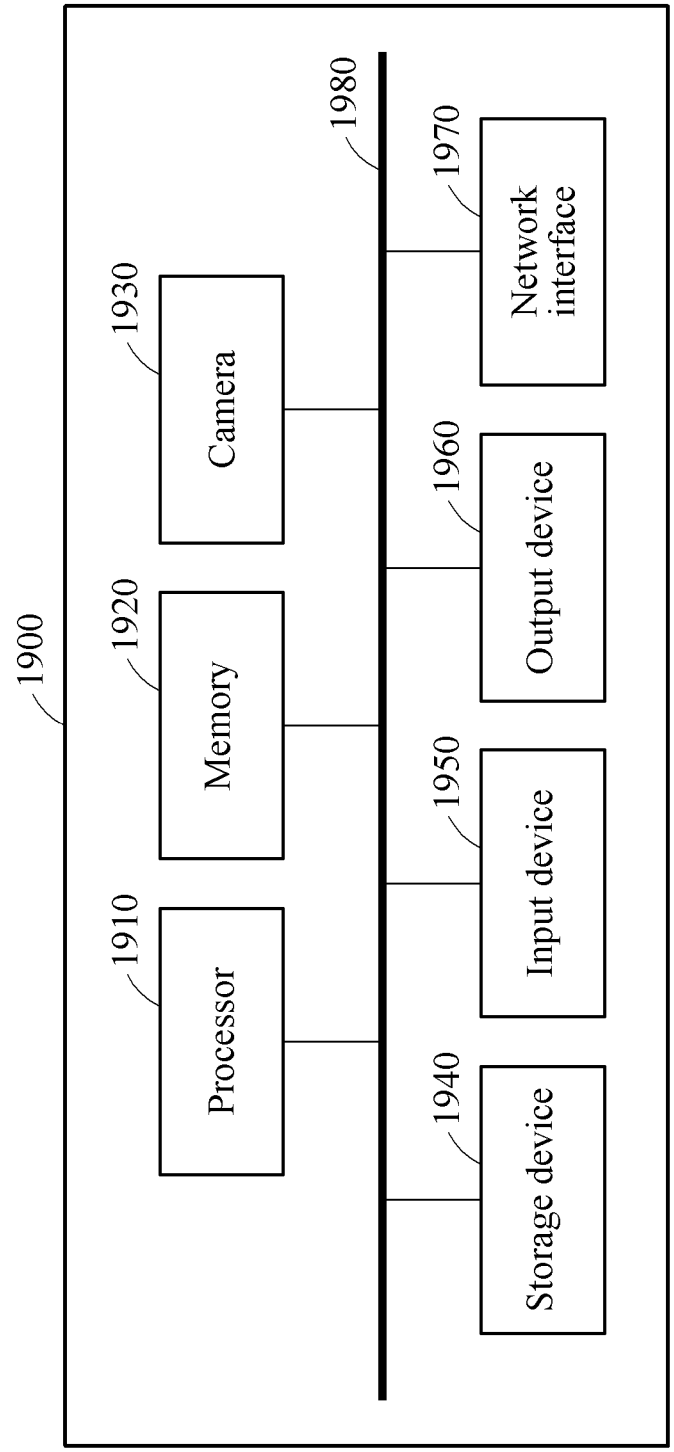
FIG. 19 is a diagram illustrating an example of an electronic apparatus.

FIG. 19 is a diagram illustrating an example of an electronic apparatus.

An electronic apparatus 1900 may estimate a gaze of a user based on an image obtained by capturing an image of the user. The electronic apparatus 1900 may include a gaze estimation apparatus described herein, and may perform operations or functions of the gaze estimation apparatus.

Referring to FIG. 19, the electronic apparatus 1900 includes at least one processor 1910, a memory 1920, a camera 1930, a storage device 1940, an input device 1950, an output device 1960, and a network interface 1970. The processor 1910, the memory 1920, the camera 1930, the storage device 1940, the input device 1950, the output device 1960, and the network interface 1970 may communicate with one another through a communication bus 1980.

The processor 1910 may execute functions and instructions to perform a gaze estimation method to estimate the gaze of a user. For example, the processor 1910 may process instructions stored in the memory 1920 or the storage device 1940. The processor 1910 may perform one or more real-time or all of operations, steps, processes, or methods described above with reference to FIGS. 1 through 18.

The memory 1920 may store the instructions to be executed by the processor 1910, and information and data to be used to estimate the gaze of the user. The memory 1920 may include a computer-readable storage medium or device.

The camera 1930 may capture or obtain an image, for example, a still image, a moving or video image, or both the images to estimate the gaze of the user.

The storage device 1940 may include a computer-readable storage medium or device.

The storage device 1940 may store a greater amount of information for a more extended period of time, compared to the memory 1920. The storage device 1940 may include, for example, a magnetic hard disk, an optical disc, a flash memory, an electrically erasable programmable read-only memory (EPROM), a floppy disk, and other types of nonvolatile memory that are well-known in the related technical field.

The input device 1950 may receive an input from the user through a tactile input, video input, an audio input, and a touch input. The input device 1950 may include, for example, a keyboard, a mouse, a touchscreen, a microphone, and other devices that may detect the input from the user and transmit the detected input to the electronic apparatus 1900.

The output device 1960 may provide an output of the electronic apparatus 1900 to the user through a visual, auditory, or tactile channel. The output device 1960 may include, for example, a display, a touchscreen, a speaker, a vibration generator, and other devices that may provide the output to the user.

The network interface 1970 may communicate with an external device through a wired or wireless network.

The gaze estimation apparatuses, gaze estimation apparatus 1700 and 1800, feature acquirer 1710, estimator 1720, processor 1810, memory 1820, the electronic apparatus 1900, processor 1910, memory 1920, camera 1930, storage device 1940, input device 1950, output device 1960, network interface 1970, and other apparatuses, devices, modules, and other components described herein with respect to FIGS. 1-19 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS to perform the operations described in this application. The hardware components may also access, manipulate, process, create, and store data in response to the execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-19 that perform the operations described in this application are performed by computing hardware, for example, by one or more processors or computers, implemented as described above, executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented gaze estimation method, comprising:
    obtaining an image including an eye region of a user;
    extracting, from the obtained image, a first feature of data;
    obtaining a second feature of data used for calibration of a neural network model; and
    estimating a position of a gaze point in a gaze area of the user from the first feature and the second feature using the neural network model,
    wherein the estimating of the position of the gaze point comprises:
    determining, from subareas into which the gaze area is divided, a subarea in which the gaze point is included based on a feature difference between the first feature and the second feature, and
    determining the position of the gaze point based on the determined subarea.

2. The method of claim 1, wherein the extracting of the first feature comprises:
    extracting the first feature using the neural network model,
    wherein the second feature is extracted using the neural network model.

3. The method of claim 1, wherein, when the gaze area is on a two-dimensional (2D) plane, the subareas of the gaze area are obtained by setting two straight lines intersecting perpendicularly at a respective calibration point of calibration points, and the gaze area is divided into the subareas based on the set straight lines.

4. The method of claim 1, wherein, when the gaze area is in a three-dimensional (3D) space, the subareas of the gaze area are obtained by setting three straight lines intersecting orthogonally at a respective calibration point of calibration points, and the gaze area is divided into the subareas based on the set straight lines.

5. The method of claim 1, before the estimating of the gaze of the user, further comprising:
when a point is used as one of calibration points, obtaining data to be used for the calibration of the neural network model based on a user action performed in response to the point,
wherein the point includes at least one of a point on a screen of an electronic apparatus, a point at a position of a button on the electronic apparatus, or a point having a relative position with respect to the electronic apparatus.

6. The method of claim 1, further comprising:
displaying a calibration point;
obtaining a calibration image which is obtained by capturing the obtained image of the user when the user gazes at the displayed calibration point; and
performing the calibration on the neural network model using the obtained calibration image.

7. A non-transitory computer-readable storage medium storing instructions that, when executed by a processor, cause the processor to perform the gaze estimation method of claim 1.

8. A gaze estimation apparatus comprising:
one or more processors configured to:
obtain an image including an eye region of a user;
control the gaze estimation apparatus to extract a first feature of data;
obtain a second feature of data used for calibration of a neural network model; and
estimate a position of a gaze point in a gaze area of the user from the first feature and the second feature using the neural network model,
wherein the one or more processors are further configured to:
determine, from subareas into which the gaze area is divided, a subarea in which the gaze point is included based on a feature difference between the first feature and the second feature, and
determine the position of the gaze point based on the determined subarea.

9. The apparatus of claim 8, wherein the one or more processors are further configured to:
extract the first feature using the neural network model, wherein the second feature is extracted using the neural network model.

10. The apparatus of claim 8, wherein, when the gaze area is on a two-dimensional (2D) plane, the subareas of the gaze area are obtained by setting two straight lines intersecting perpendicularly at a respective calibration point of calibration points, and the gaze area is divided into the subareas based on the set straight lines.

11. The apparatus of claim 8, wherein, when the gaze area is in a three-dimensional (3D) space, the subareas of the gaze area are obtained by setting three straight lines intersecting orthogonally at a respective calibration point of calibration points, and the gaze area is divided into the subareas based on the set straight lines.

12. The apparatus of claim 8, wherein the one or more processors are further configured to:
before the estimating of the gaze of the user, when a point is used as one of calibration points, obtain data to be used for the calibration of the neural network model based on a user action performed in response to the point,
wherein the point includes at least one of a point on a screen of an electronic apparatus, a point at a position of a button on the electronic apparatus, or a point having a relative position with respect to the electronic apparatus.

13. The apparatus of claim 8, wherein the one or more processors are further configured to:
display a calibration point;
obtain a calibration image which is obtained by capturing the obtained image of the user when the user gazes at the displayed calibration point; and
perform the calibration on the neural network model using the obtained calibration image.

* * * * *